(12) United States Patent
Joly

(10) Patent No.: US 8,929,207 B1
(45) Date of Patent: *Jan. 6, 2015

(54) NETWORK DEVICE ARCHITECTURE FOR CENTRALIZED PACKET PROCESSING

(75) Inventor: Christophe Joly, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/911,254

(22) Filed: Oct. 25, 2010

Related U.S. Application Data

(63) Continuation of application No. 10/902,913, filed on Jul. 30, 2004, now Pat. No. 7,822,025, which is a continuation of application No. 10/887,129, filed on Jul. 8, 2004, now Pat. No. 7,808,983.

(51) Int. Cl.
*H04L 12/26* (2006.01)

(52) U.S. Cl.
USPC .......................................................... 370/229

(58) Field of Classification Search
USPC .................................. 370/389–392, 401, 466
See application file for complete search history.

(56) References Cited

U.S. PATENT DOCUMENTS

| | | | |
|---|---|---|---|
| 4,387,371 A | 6/1983 | Beker et al. | 340/825.52 |
| 5,058,110 A | 10/1991 | Beach et al. | 370/464 |
| 5,311,593 A | 5/1994 | Carmi | 713/162 |
| 5,371,852 A | 12/1994 | Attanasio et al. | 709/245 |
| 5,394,402 A * | 2/1995 | Ross | 370/402 |
| 5,473,599 A | 12/1995 | Li et al. | 370/219 |
| 5,517,620 A | 5/1996 | Hashimoto et al. | 709/242 |
| 5,615,340 A | 3/1997 | Dai et al. | 709/250 |
| 5,680,589 A | 10/1997 | Klingman | 703/23 |
| 5,822,512 A | 10/1998 | Goodrum et al. | 714/13 |
| 5,825,772 A | 10/1998 | Dobbins et al. | 370/396 |
| 5,835,725 A | 11/1998 | Chiang et al. | 709/228 |
| 5,872,783 A | 2/1999 | Chin | 370/395.32 |
| 5,959,968 A | 9/1999 | Chin et al. | 370/216 |
| 5,959,972 A | 9/1999 | Hamami | 370/228 |
| 5,959,989 A | 9/1999 | Gleeson et al. | 370/390 |
| 5,978,852 A | 11/1999 | Myrick et al. | 709/238 |

(Continued)

FOREIGN PATENT DOCUMENTS

| | | |
|---|---|---|
| CN | 1407762 | 4/2003 |
| EP | 1 035 685 | 9/2000 |

(Continued)

OTHER PUBLICATIONS

Michael R. Smith, Jeffrey YM Wang, Ali Golshan; "Port-Based Loadsharing for a Satellite Switch;" U.S. Appl. No. 10/690,348, filed Oct. 21, 2003; 47 pages of Specification (including claims & abstract); and 11 sheets of drawings.

(Continued)

*Primary Examiner* — Robert C Scheibel
*Assistant Examiner* — Omeed D Rahgozar
(74) *Attorney, Agent, or Firm* — Campbell Stephenson LLP

(57) ABSTRACT

A method and system for centralized packet processing is disclosed. The method includes transferring a packet received at a port interface of a network device to an uplink interface of the network device, and sending the packet to an uplink from the uplink interface. The transferring and the sending are performed irrespective of a destination of the packet.

15 Claims, 13 Drawing Sheets

(56) References Cited

U.S. PATENT DOCUMENTS

| | | | |
|---|---|---|---|
| 5,999,531 A * | 12/1999 | Ferolito et al. | 370/390 |
| 6,032,194 A | 2/2000 | Gai et al. | 709/239 |
| 6,064,671 A | 5/2000 | Killian | 370/389 |
| 6,085,238 A | 7/2000 | Yuasa et al. | 709/223 |
| 6,108,300 A | 8/2000 | Coile et al. | 370/217 |
| 6,163,543 A | 12/2000 | Chin et al. | 370/400 |
| 6,181,681 B1 | 1/2001 | Hiscock et al. | 370/279 |
| 6,181,699 B1 | 1/2001 | Crinion et al. | 370/392 |
| 6,195,351 B1 | 2/2001 | Hiscock et al. | 370/389 |
| 6,202,114 B1 | 3/2001 | Dutt et al. | 710/311 |
| 6,222,820 B1 | 4/2001 | Hamami | 370/218 |
| 6,229,787 B1 | 5/2001 | Byrne | 370/218 |
| 6,236,659 B1 | 5/2001 | Pascoe | 370/404 |
| 6,243,360 B1 | 6/2001 | Basilico | 370/231 |
| 6,266,335 B1 | 7/2001 | Bhaskaran | 370/399 |
| 6,275,953 B1 | 8/2001 | Vahalia et al. | 714/11 |
| 6,285,656 B1 | 9/2001 | Chaganty et al. | 370/228 |
| 6,298,061 B1 | 10/2001 | Chin et al. | 370/400 |
| 6,308,218 B1 | 10/2001 | Vasa | 709/238 |
| 6,308,220 B1 | 10/2001 | Mathur | 709/238 |
| 6,377,992 B1 | 4/2002 | Fernandez et al. | 709/227 |
| 6,388,995 B1 | 5/2002 | Gai et al. | 370/256 |
| 6,400,715 B1 | 6/2002 | Beaudoin et al. | 370/402 |
| 6,421,787 B1 | 7/2002 | Slaughter et al. | 714/4 |
| 6,460,088 B1 | 10/2002 | Merchant | 709/236 |
| 6,487,591 B1 | 11/2002 | Budhraja et al. | 709/223 |
| 6,519,231 B1 | 2/2003 | Ding et al. | 370/256 |
| 6,535,490 B1 | 3/2003 | Jain | 370/256 |
| 6,535,491 B2 | 3/2003 | Dutt et al. | 370/256 |
| 6,567,403 B1 | 5/2003 | Congdon et al. | 370/389 |
| 6,570,845 B1 | 5/2003 | Blanc et al. | 370/218 |
| 6,657,973 B1 | 12/2003 | Arima | 370/254 |
| 6,658,016 B1 | 12/2003 | Dai et al. | 370/424 |
| 6,674,713 B1 | 1/2004 | Berg et al. | 370/217 |
| 6,678,241 B1 | 1/2004 | Gai et al. | 370/216 |
| 6,687,758 B2 | 2/2004 | Craft et al. | 709/250 |
| 6,690,668 B1 | 2/2004 | Szczepanek et al. | 370/392 |
| 6,697,339 B1 | 2/2004 | Jain | 370/256 |
| 6,728,780 B1 | 4/2004 | Hebert | 709/239 |
| 6,735,198 B1 | 5/2004 | Edsall et al. | 370/389 |
| 6,735,205 B1 | 5/2004 | Mankude et al. | 370/395.32 |
| 6,738,345 B1 | 5/2004 | Williamson | 370/217 |
| 6,760,776 B1 | 7/2004 | Gallo et al. | 709/238 |
| 6,804,721 B2 | 10/2004 | Wils et al. | 709/230 |
| 6,810,421 B1 | 10/2004 | Ishizaki et al. | 709/226 |
| 6,816,467 B1 | 11/2004 | Muller et al. | 370/256 |
| 6,856,591 B1 | 2/2005 | Ma et al. | 370/216 |
| 6,915,340 B2 | 7/2005 | Tanaka | 709/220 |
| 6,938,095 B2 | 8/2005 | Basturk et al. | 709/238 |
| 6,941,487 B1 | 9/2005 | Balakrishnan et al. | 714/4 |
| 6,956,858 B2 | 10/2005 | Hariguchi et al. | 370/395.31 |
| 6,980,534 B1 | 12/2005 | Nee et al. | 370/329 |
| 6,981,174 B1 | 12/2005 | Hanning | 714/5.1 |
| 7,042,855 B2 | 5/2006 | Gilchrist et al. | 370/328 |
| 7,050,433 B2 | 5/2006 | Ando et al. | 370/392 |
| 7,061,858 B1 | 6/2006 | Di Benedetto et al. | 370/219 |
| 7,061,875 B1 | 6/2006 | Portolani et al. | 370/256 |
| 7,079,533 B1 | 7/2006 | Erimli et al. | 370/388 |
| 7,126,923 B1 | 10/2006 | Yang et al. | 370/256 |
| 7,127,633 B1 | 10/2006 | Olson et al. | 714/4 |
| 7,130,305 B2 | 10/2006 | Kuukankorpi et al. | 370/392 |
| 7,152,178 B1 | 12/2006 | Vook et al. | 714/4.3 |
| 7,178,052 B2 | 2/2007 | Hebbar et al. | 714/4 |
| 7,188,189 B2 | 3/2007 | Karol et al. | 709/238 |
| 7,251,217 B2 | 7/2007 | Wong et al. | 709/232 |
| 7,286,853 B2 | 10/2007 | Meier | 455/560 |
| 7,502,865 B2 | 3/2009 | Seto | 709/238 |
| 7,636,369 B2 | 12/2009 | Wong | 370/389 |
| 7,639,605 B2 | 12/2009 | Narayanan et al. | 370/219 |
| 7,668,123 B1 | 2/2010 | Scott et al. | 370/140 |
| 7,672,228 B1 | 3/2010 | Senevirathne et al. | 370/219 |
| 7,818,628 B1 | 10/2010 | Bishara | 714/43 |
| 7,822,025 B1 * | 10/2010 | Joly | 370/389 |
| 7,869,803 B2 * | 1/2011 | Corson et al. | 455/433 |
| 8,005,981 B2 | 8/2011 | Tuck et al. | 709/238 |
| 8,094,581 B2 * | 1/2012 | Bahls et al. | 370/254 |
| 2001/0014097 A1 | 8/2001 | Beck et al. | 370/401 |
| 2002/0016874 A1 | 2/2002 | Watanuki et al. | 710/51 |
| 2002/0018489 A1 | 2/2002 | Ambe et al. | 370/475 |
| 2002/0073338 A1 | 6/2002 | Burrows et al. | 726/13 |
| 2002/0080720 A1 | 6/2002 | Pegrum et al. | 370/236 |
| 2002/0087716 A1 | 7/2002 | Mustafa | 709/236 |
| 2002/0089978 A1 | 7/2002 | Wang et al. | 370/389 |
| 2002/0091755 A1 | 7/2002 | Narin | 709/203 |
| 2002/0103921 A1 | 8/2002 | Nair et al. | 709/232 |
| 2002/0110148 A1 | 8/2002 | Hickman et al. | 370/475 |
| 2002/0126671 A1 | 9/2002 | Ellis et al. | 370/390 |
| 2002/0146008 A1 | 10/2002 | Kaplan | 370/390 |
| 2002/0152320 A1 | 10/2002 | Lau | 709/238 |
| 2002/0156612 A1 | 10/2002 | Schulter et al. | 703/23 |
| 2002/0165981 A1 | 11/2002 | Basturk et al. | 709/242 |
| 2002/0176450 A1 | 11/2002 | Kong et al. | 370/539 |
| 2002/0184387 A1 | 12/2002 | Yamaya et al. | 709/238 |
| 2002/0186654 A1 | 12/2002 | Tornar | 370/225 |
| 2002/0188711 A1 | 12/2002 | Meyer et al. | 709/223 |
| 2002/0196802 A1 | 12/2002 | Sakov et al. | 370/432 |
| 2003/0007489 A1 | 1/2003 | Krishnan et al. | 370/392 |
| 2003/0026248 A1 | 2/2003 | Hiroki | 370/352 |
| 2003/0037165 A1 | 2/2003 | Shinomiya | 709/238 |
| 2003/0051061 A1 | 3/2003 | Hank et al. | 709/250 |
| 2003/0061533 A1 | 3/2003 | Perloff et al. | 714/9 |
| 2003/0093557 A1 | 5/2003 | Giraud et al. | 709/239 |
| 2003/0097470 A1 | 5/2003 | Lapuh et al. | 709/239 |
| 2003/0110344 A1 | 6/2003 | Szczepanek et al. | 711/100 |
| 2003/0142680 A1 | 7/2003 | Oguchi | 370/400 |
| 2003/0152101 A1 | 8/2003 | Feng | 370/445 |
| 2003/0169734 A1 | 9/2003 | Lu et al. | 370/386 |
| 2003/0172147 A1 | 9/2003 | Chang et al. | 709/223 |
| 2003/0174709 A1 | 9/2003 | Shankar | 370/395.31 |
| 2003/0198231 A1 | 10/2003 | Kalkunte et al. | 370/395.31 |
| 2004/0057469 A1 | 3/2004 | Nuss et al. | 370/535 |
| 2004/0066781 A1 | 4/2004 | Shankar et al. | 370/389 |
| 2004/0078621 A1 | 4/2004 | Talaugon et al. | 714/4 |
| 2004/0098501 A1 | 5/2004 | Finn | 709/236 |
| 2004/0105390 A1 | 6/2004 | Saksio | 370/245 |
| 2004/0156390 A1 | 8/2004 | Prasad et al. | 370/466 |
| 2004/0179507 A1 | 9/2004 | Batra et al. | 370/343 |
| 2004/0208116 A1 | 10/2004 | Saint Etienne et al. | 370/216 |
| 2005/0036488 A1 | 2/2005 | Kalkunte et al. | 370/389 |
| 2005/0041665 A1 | 2/2005 | Weyman et al. | 370/390 |
| 2005/0044186 A1 | 2/2005 | Petrisor | 709/219 |
| 2005/0047334 A1 * | 3/2005 | Paul et al. | 370/229 |
| 2005/0058063 A1 | 3/2005 | Masuyama et al. | 370/217 |
| 2005/0063395 A1 | 3/2005 | Smith et al. | 370/399 |
| 2005/0083933 A1 | 4/2005 | Fine et al. | 370/390 |
| 2005/0089014 A1 | 4/2005 | Levin et al. | 370/351 |
| 2005/0091358 A1 | 4/2005 | Mehra | 709/223 |
| 2005/0111483 A1 | 5/2005 | Cripe et al. | 370/463 |
| 2005/0169311 A1 | 8/2005 | Millet et al. | 370/471 |
| 2005/0193114 A1 | 9/2005 | Colby et al. | 709/226 |
| 2005/0198371 A1 | 9/2005 | Smith et al. | 709/238 |
| 2005/0207436 A1 * | 9/2005 | Varma | 370/412 |
| 2005/0243826 A1 | 11/2005 | Smith et al. | 370/392 |
| 2005/0259646 A1 | 11/2005 | Smith et al. | 370/389 |
| 2005/0265346 A1 | 12/2005 | Ho et al. | 370/392 |
| 2006/0007859 A1 * | 1/2006 | Kadambi et al. | 370/229 |
| 2006/0015643 A1 | 1/2006 | Orava et al. | 709/238 |
| 2006/0062187 A1 | 3/2006 | Rune | 370/338 |
| 2006/0190588 A1 | 8/2006 | Nakayama | 709/224 |
| 2006/0215679 A1 | 9/2006 | Musoll et al. | 370/412 |
| 2006/0262791 A1 | 11/2006 | Kadambi | 370/389 |
| 2007/0154219 A1 | 7/2007 | Feinberg | 398/104 |
| 2007/0159971 A1 | 7/2007 | Zhang et al. | 370/230 |
| 2007/0180266 A1 | 8/2007 | Kang et al. | 713/189 |
| 2009/0080431 A1 | 3/2009 | Rekhter | 370/392 |
| 2009/0134996 A1 | 5/2009 | White et al. | 340/538 |

FOREIGN PATENT DOCUMENTS

| | | |
|---|---|---|
| EP | 1 309 135 | 5/2003 |
| EP | 1 401 147 | 3/2004 |
| GB | 2 362 538 | 5/2000 |
| WO | WO 00/72531 | 11/2000 |
| WO | WO 00/78004 | 12/2000 |

(56) References Cited

FOREIGN PATENT DOCUMENTS

| WO | WO 02/01413 | 1/2002 |
|---|---|---|
| WO | WO 02/18965 | 3/2002 |
| WO | WO 03/081451 | 10/2003 |

OTHER PUBLICATIONS

Knight, S. et al. Virtual Router Redundancy Protocol, IETF, Apr. 1998, 27 pages.

International Search Report dated Aug. 2, 2005, from related International Application No. PCT/US2004/029554, 6 pages.

Written Opinion of the International Searching Authority dated Aug. 2, 2005 from related International Application No. PCT/US2004/029554, 5 pages.

International Search Report dated Jan. 14, 2005 from corresponding International Application No. PCT/US2004/029553, 4 pages.

Written Opinion of the International Searching Authority dated Jan. 14, 2005 from corresponding International Application No. PCT/US2004/029553, 6 pages.

CIPO Examination Report in related Canadian Patent Application No. 2,534,511 dated May, 1, 2006, 4 pages.

Cisco Systems, Inc.: Copyright 1989-1997, http://www.cisco.com/univercd/cc/td/doc/product/rtrmgmt/sw.sub.--ntman/cw-simain/cwsi2/cwsiug2/vlan2/stpapp.htm; "Understanding Spanning-Tree Protocol," Appendix C, pp. C-1 through C-12.

Pedroso, Carlos Marcelo and Fonseca, Keiko, Modeling Weight Round Robin Packet Scheduler With Petri Nets, Communication Systems, IEEE, vol. I, Nov. 25, 2002, pp. 342-345.

Liu, Drake, et al, Configuration-Based Architecture for High Speed and General-Purpose Protocol Processing, Signal Processing Systems, IEEE, Oct. 20, 1999, pp. 540-547.

D.T. Stott, "Layer-2 Path Discovery Using Spanning Tree MIBs", Avaya Labs Research, Avaya, Inc., Mar. 7, 2002, pp. 1-23.

International Search Report as mailed from the PCT on Mar. 18, 2005, for International Application No. PCT/US2004/034851, 2 pages.

News Release: "Cisco Raises the Bar in Stackable Switching, Introduces Catalyst 3750 Series with Cisco StackWise.TM. Technology;" 3 pages; http://newsroom.cisco.com/dlls/prod.sub.--041503b.html, Apr. 15, 2003.

Cisco Catalyst 3750 Series Switches: "Cisco StackWise Technology White Paper;" 8 pages; http://www.cisco.com/en/US/products/hw/switches/ps5023/products.sub.--whi- te.sub.--paper09186a00801b096a.shtml (Catalyst 3750 announced on Apr. 15, 2003, see AJ), Nov. 2006.

Hewlett Packard, "LAN Aggregation Through Switch Meshing," XP-002284775, Jun. 1998, URL:http:/www.hp.com/rnd/library/pdf/techlib.sub.--meshing.pdf [retrieved on Jun. 16, 2004], 12 pages.

Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0-7803-5258-0, Feb. 10, 1999, pp. 461-468.

Michael Ward; "802.1S Solves Architecture Issues;" NetworkWorld, Aug. 4, 2003; 3 pages; http://www.n.sub.--wfusion.com/cgi-bin/mailto/x.cgi.

Nortel Networks, "Split Multi-link Trunking," http://www.nortelnetworks.com/corporate/technology/smlt/, pp. 1-2 (printed Jul. 17, 2003).

Nortel Networks, "Split Multi-link Trunking FAQs," http://www.nortelnetworks.com/corporate/technology/smlt/faq.html, pp. 1-3 (printed on Oct. 21, 2003).

\* cited by examiner

NETWORK DEVICE ARCHITECTURE FOR CENTRALIZED PACKET PROCESSING

This application is a continuation of U.S. patent application Ser. No. 10/902,913, entitled "Network Device Architecture for Centralized Packet Processing," filed Jul. 30, 2004, which issued as U.S. Pat. No. 7,822,025, on Oct. 26, 2010, which is a continuation of U.S. patent application Ser. No. 10/887,129, entitled "Virtual Network Device Clusters," filed Jul. 8, 2004, which issued as U.S. Pat. No. 7,808,983 on Oct. 5, 2010 and naming Christophe Joly as the inventor.

BACKGROUND OF THE INVENTION

1. Field of the Invention

This invention relates to the field of information networks, and more particularly relates to a network device architecture for centralized packet processing, and a method of operating such a network device.

2. Description of the Related Art

Today's computer networks typically employ a hierarchical approach, allowing devices at a relatively lower level in the network hierarchy to perform as much of the packet processing functions as is reasonably possible. Typically, the network hierarchy employed follows the separation of layers in the network protocol employed. In fact, it can be argued that this arrangement flows naturally from the notion that processing is best performed as near to the source and/or destination of a packet as is reasonably possible. This philosophy is exemplified by the network architecture and its operation discussed in connection with FIGS. 1 and 2.

FIG. 1 is a block diagram of a network 100 of the prior art that includes several network devices. In FIG. 1, several clients (depicted as host network devices 102(1)-102(N) in FIG. 1) communicate with each other and with several servers 104(1)-104(N) via network 100. Host network devices 102(1)-102(N) can include a variety of different devices that access networked services. For example, host network device 102(1) can be a cell phone, a personal computer, a Personal Digital Assistant (PDA) or other computing device. Servers 104(1)-104(N) provide various services, such as various software-based services and/or access to shared storage devices.

Network 100, which includes elements that couple host network devices 102(1)-102(N) and servers 104(1)-104(N), can be described in terms of several network layers. The layer closest to host network devices 102(1)-102(N) is access layer 110. Access layer 110 includes several access layer network devices 120(1)-120(N). In this example, access layer 110 is the primary layer at which packets enter the network from host network devices 102(1)-102(N).

Distribution layer 112 aggregates flows received via access layer 110 and provides these aggregated flows to core layer 114. In this example, distribution layer 112 includes distribution layer network devices 122(1)-122(N). Core layer 114 is a logically centralized portion of the network through which various aggregated flows pass. Core layer 114 includes core network devices 124(1)-124(N).

In this example, data center 116 includes two sets of network devices: data center network devices 126(1)-126(N) and data center network devices 128(1)-128(N). Data center network devices 128(1)-128(N) provide various ones of servers 104(1)-104(N) access to network 100. Data center network devices 126(1)-126(N) aggregate flows from data center network devices 128(1)-128(N) and provide the aggregated flows to core layer 114.

It is noted that in some embodiments, a given network will not include the network layers illustrated in FIG. 1 (e.g., some of the layers can be combined and/or eliminated, and alternative layers can also be included in addition to and/or instead of those shown in FIG. 1). Additionally, clients and servers can be coupled to the network differently than shown in FIG. 1 (e.g., some clients and/or servers can be coupled to individual network devices in the core and/or distribution layers, or to multiple such devices). Additionally, the physical locations of devices relative to each other can differ from the logical locations shown in FIG. 1. For example, two devices in the same network layer can be physically located on different floors of a building, in different buildings, on different campuses, or at even greater physical distances from one another. Conversely, two devices in different network layers can be co-located with one another.

Typically, access layer network devices 120(1)-120(N) and data center network devices 128(1)-128(N), which are located at the outer edges of network 100, operate differently than distribution layer network devices 122(1)-122(N), core network devices 124(1)-124(N), and data center network devices 126(1)-126(N), which are located in the inner layers of network 100. Typically, in the case in which network 100 implements an Open Systems Interconnection (OSI) model, access layer network devices 120(1)-120(N) provide L2 (Layer 2) forwarding functionality, as can data center network devices 128(1)-128(N). In like manner, distribution layer network devices 122(1)-122(N) can provide L3 (Layer 3) routing functionality, as can data center network devices 126(1)-126(N). As will therefore be appreciated, access layer network devices 120(1)-120(N), distribution layer network devices 122(1)-122(N), core network devices 124(1)-124(N), and data center network devices 126(1)-126(N) and 128(1)-128(N) can include various routers, switches, gateways, and other network equipment.

FIG. 2 is a block diagram illustrating packet flow in a network architecture 200 of the prior art. Network architecture 200 includes a number of host network devices (depicted in FIG. 2 as host network devices 205(1)-(N)), an access layer 210, and a distribution layer 220. Access layer 210 includes a number of access layer devices (exemplified in FIG. 2 by switches 225(1)-(N)). Similarly, distribution layer 220 includes one or more distribution layer devices (exemplified in FIG. 2 by a router 230). Each of host network devices 205(1)-(N) is coupled to at least one of switches 225(1)-(N) by one of a number of network connections 235(1)-(N). Similarly, each of switches 225(1)-(N) is coupled to a device in distribution layer 220 (e.g., router 230) by one of a number of network connections 240(1)-(N).

An example of the flow of packets through network architecture 200 can be described using network architecture 200. This example is based on the use of an Open System Interconnection (OSI) model, in which switches 225(1)-(N) implement packet switching at the data link layer (i.e., OSI layer 2), while router 230 implements packet routing at the network layer (i.e., OSI layer 3; also referred to as the internetworking or IP layer). In the case in which a packet is to be switched at the data link layer, a packet is conveyed from a host network device (e.g., host network device 205(1)) to one of the switches in the access layer (e.g., switch 225(1)) along a path 250. Assuming that the destination of the packet is connected to switch 225(1), switch 225(1) can perform the switching functions necessary to convey the packet to its intended destination. In the case depicted in FIG. 2, the packet is switched along path 250 to the port to which host network device 205(2) is connected. Switch 225(1) thus conveys the packet, having been received from host network device 205(1), along path 250 to host network device 205(2).

As is apparent, none of the other switches within access layer 210 need be involved in the foregoing operations, nor any of the devices in distribution layer 220. However, in the case, where the packet is destined for a destination host network device that is not connected to the same switch as the source host network device (or other network layer processing (e.g., routing) needs to be performed), such packets are forwarded to distribution layer 220 for processing (e.g., routing) by the devices therein (e.g., router 230). An example of a course such a packet might take is now discussed. In this example, host network device 205(1) wishes to send a packet to host network device 205(N). As can be seen, host network device 205(1) has no way to send this packet to host network device 205(N) using only the switches in access layer 210.

In this example, then, a device in distribution layer 220 (e.g., router 230) is called into action. Host network device 205(1) thus sends a packet to switch 225(1) along path 260. Switch 225(1) determines that the packet can not be forwarded to its destination by being forwarded to one of the front-end ports of switch 225(1). This being the case, switch 225(1) forwards the packet to router 230 via network connection 240(1) (which is shown in FIG. 2 as being part of path 260). Router 230 then determines which one of switches 225(1)-(N) is able to forward the packet to its intended destination (host network device 205(N)). Router 230 determines that this can be accomplished by forwarding the packet to switch 225(N) along path 260 (via network connection 240(N)). Router 230 thus forwards the packet along path 260 to switch 225(N) along path 260. Switch 225(N) then forwards the packet to its intended destination, host network device 205(N), via network connection 235(N) (again along path 260).

As is therefore apparent, switch 225(1)-(N) includes the functionality necessary to make determinations as to the forwarding of a packet received either from one of host network devices 205(1)-(N) or from a distribution layer device such as router 230. Moreover, each of switches 225(1)-(N) is capable of making "local" forwarding decisions (e.g., forwarding decisions regarding host network devices connected to the front-end ports of the given switch), without intervention or support from other of the network devices within network architecture 200.

As can be seen in FIGS. 1 and 2, the number of devices at the access layer can be quite large, and is typically significantly larger than the number of devices at the distribution layer. When combined with the philosophy of performing packet processing at the lower layers of the network hierarchy (regardless of the network topology), it will be appreciated that such an approach can encounter a number of difficulties. This is because such an approach creates a relatively large number of points of management for a given network protocol layer.

The most obvious problem encountered by such an approach is the need to manage what can become a very large number of access layer devices. As will be appreciated, the number of access layer devices can grow geometrically (and even exponentially) in relation to the number of distribution layer devices. Managing such a large number of devices can prove challenging, and as the number of such devices grows, the management tasks only become more unwieldy. Such management challenges include the upgrading of hardware and/or software (potentially for each one of the aforementioned large number of devices), as well as the potential need to analyze packet flows through large numbers of such devices in determining the source of errors or the cause of a failure.

A large number of access layer devices also translates into the need to replace a large numbers of devices, when such devices become outmoded. If the devices are replaced in such situations, not only is substantial effort required (both in terms of physical installation of the new devices, as well as in terms of their configuration), but the capital investment made in the existing devices is lost.

In addition to the substantial effort required to manage such access layer devices, substantial costs (e.g., on a per-port basis) are typically involved. Because each access layer device in such a network includes the functionality (i.e., the packet processing capabilities) required to process packets at the given network protocol layer, each such access layer device incurs the cost of the hardware and software necessary to support such functionality. Since each such access layer device can only support a certain number of ports, a corresponding portion of the cost of such hardware and software must be attributed to each such port, resulting in a higher per-port cost than might otherwise be the case. Moreover, this cost is incurred regardless the number of host network devices connected thereto (or more importantly, not connected thereto), potentially making the cost on a per-host network device basis even higher than the per-port cost.

Moreover, as depicted in FIG. 1, such a network architecture traditionally supports servers as "leaf nodes" (i.e., at the lowest level in the network hierarchy), requiring users to access such servers via the access and distribution layer devices to which the desired server is connected. As such, servers are coupled to the network in the same manner as host network devices. While such uniformity is logically consistent (a computing device is connected to the network via an access layer device and a distribution layer device, regardless of whether the device is a host network device or a server), which may provide conceptual simplicity, such an approach can obviously subject the access and distribution layer devices supporting a given server to significantly greater loads than might otherwise be the case. Such loads can lead to difficulties in accessing the server. Moreover, with each additional device in the path between a given host network device and a server, comes the greater possibility of failures along that path.

What is therefore needed is a method and system that minimize the administrative efforts needed to manage a given network topology, while providing the connectivity and functionality needed by end-users. Preferably, such an approach would also reduce the costs of such a network architecture (e.g., on a per-port or per-host basis). Such an approach should also provide the ability to balance network loads and reliability with ease of access and administration, and should provide at least some protection for the capital investment made in such systems.

SUMMARY OF THE INVENTION

In one embodiment, an apparatus is disclosed. The apparatus includes a lower-layer network device including an upstream packet processing section. The upstream packet processing section includes an uplink transmit unit. The uplink transmit unit is configured to transfer a packet received by the lower-layer network device to an upper-layer network device coupled to the lower-layer network device. The upstream packet processing section is configured to perform the transferring irrespective of a destination of the packet.

In another embodiment, an apparatus is disclosed. The apparatus includes a lower-layer network device, that included an interface controller unit. The interface controller unit is configured to cause a packet received by the lower-layer network device to be transferred to an upper-layer network device coupled to the lower-layer network device. The interface controller unit is further configured to cause the transferring of the packet irrespective of a destination of the packet.

In yet another embodiment, an apparatus is disclosed. The apparatus includes a network device configured to process a packet including a packet header. The packet header includes a source index field, and a destination index field. The source index field and the destination index field are logical port indices.

In still another embodiment, a method is disclosed. The method includes transferring a packet received at a port interface of a network device to an uplink interface of the network device, and sending the packet to an uplink from the uplink interface. The transferring and the sending are performed irrespective of a destination of the packet.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION

Figure 1:
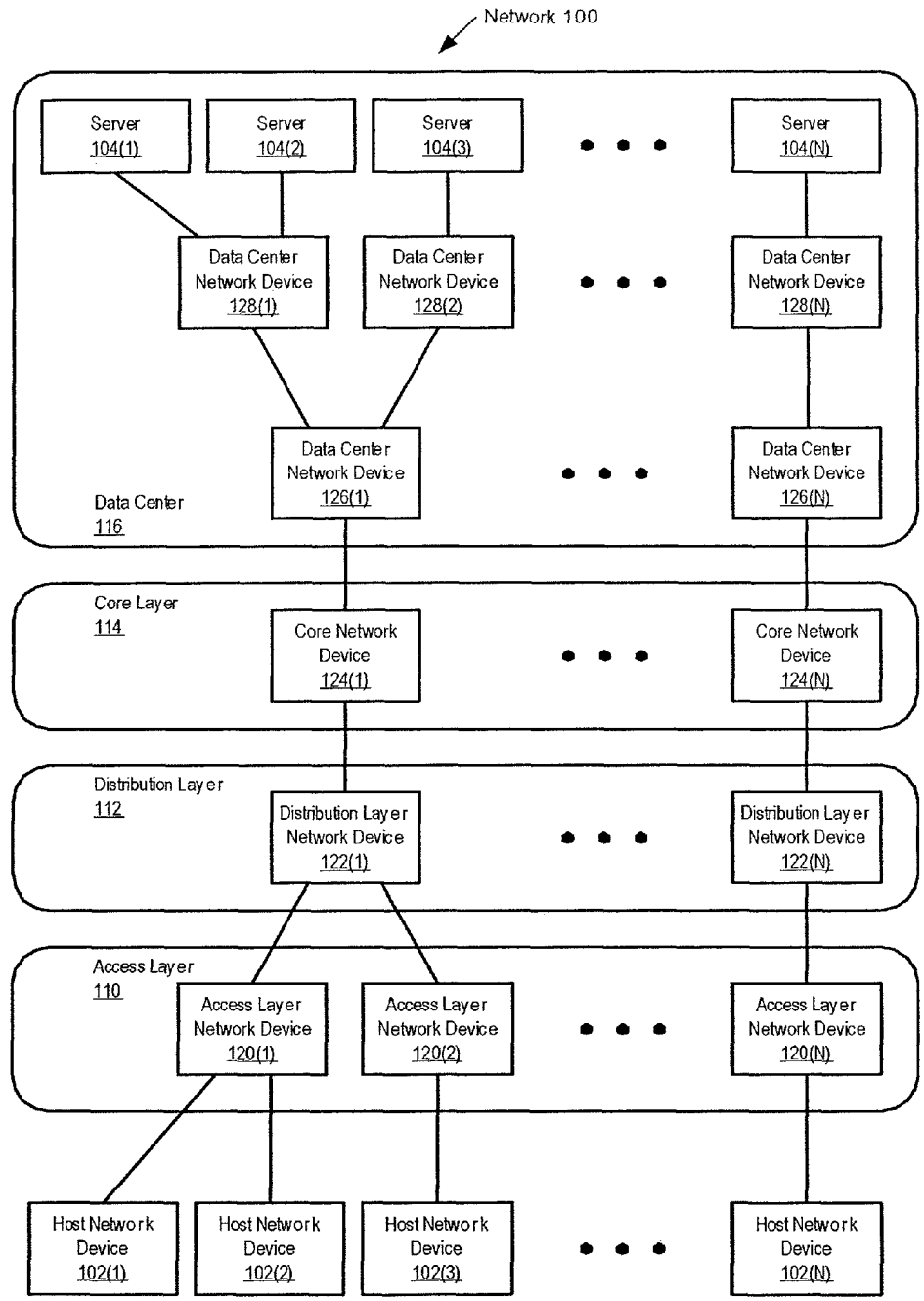
FIG. 1 is a block diagram illustrating a network architecture of the prior art.
Figure 2:
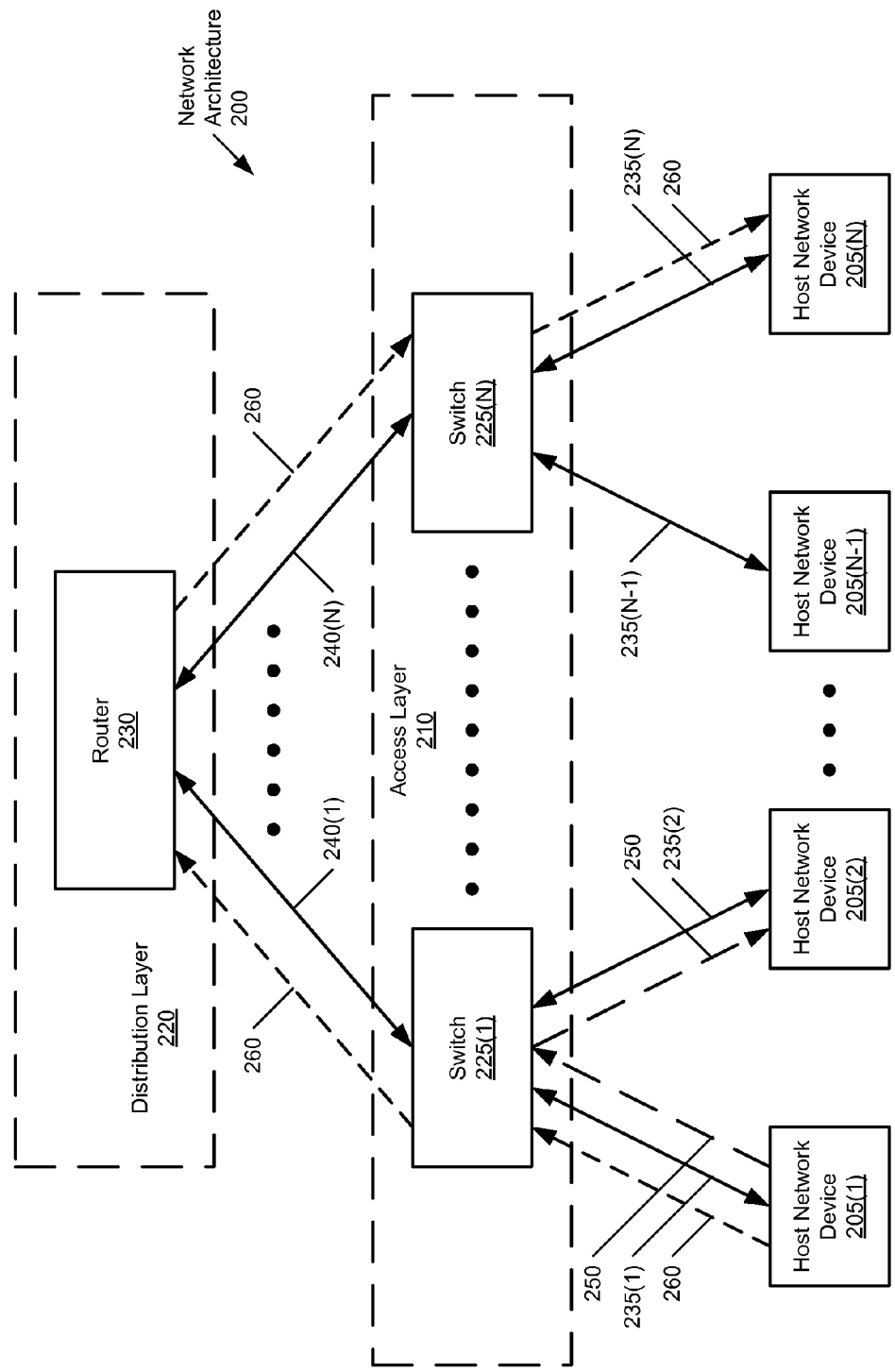
FIG. 2 is a block diagram illustrating packet flow in a network architecture of the prior art.

The following is intended to provide a detailed description of an example of the invention and should not be taken to be limiting of the invention itself. Rather, any number of variations may fall within the scope of the invention which is defined in the claims following the description.
Introduction The present invention provides a method and apparatus that addresses the limitations outlined earlier by providing a network device architecture that supports a more centralized approach to packet processing, as well as a method of operating such a network device. In an architecture of the present invention, a lower-layer network device relies on the upper-layer network device to which the lower-layer network device is coupled, to perform packet processing traditionally performed by the lower-layer network device (i.e., lower-layer protocol processing), in addition to the packet processing traditionally performed by the upper-layer network device (i.e., upper-layer protocol processing). The re-assignment of such lower-layer protocol processing from the lower-layer network device to the upper-layer network device thus mandates that a packet requiring such packet processing be passed from the lower-layer network device to the upper-layer network device in which such packet processing is now performed. For example, an access layer network device according to the present invention need only perform minimal packet processing. Instead, the processing typically performed by traditional access layer network devices (e.g., L2 processing) is performed by the distribution layer network device to which the access layer network device is coupled. This necessitates the passing of packets requiring such packet processing, from the access layer network device to the distribution layer network device (in which such packet processing is now performed).

A number of advantages are provided by the relocation and resulting centralization of network processing made possible by embodiments of the present invention. Chief among these advantages is the simplification of network administration in a network architecture employing the present invention, and the attendant savings provided thereby. By relocating network processing to a higher layer in a given network architecture (whatever manner of network processing that might be), the resulting centralization of the hardware and software performing the network processing simplifies network management by reducing the number of points of management. For example, in the case of packet processing, when relocating such packet processing from network devices in the access layer to the network devices in the distribution layer, the number of points of management is reduced significantly.

Another aspect of this particular advantage of the present invention is the ability to provide low-cost special services (e.g., traffic prioritization, authentication, security, accounting and the like). This means that special processing of a given packet can be provided in a manner that is significantly less resource-intensive than would be the case in a traditional network architecture. For example, in a traditional network architecture, in order to perform the packet processing typically performed by a distribution layer network device, a packet must first be processed at the lower-layer network device, and then passed to the upper-layer network device for the special processing desired. Alternatively, the hardware and software needed to perform such packet processing must be deployed to each lower-layer network device intended to perform such special processing, a potentially momentous undertaking.

In a network architecture of the present invention, however, there is minimal additional cost associated with such special processing (save for the special processing itself), because the packet is sent to the upper-layer network device as a matter of course. In effect, the lower-layer network device inherits the packet processing capabilities of its associated upper-layer network device. Thus, by passing packets to the upper-layer network device, a network architecture of the present invention is able to provide a broad range of functionality, for minimal or no additional cost.

Another advantage of certain embodiments of the present invention is the ability to perform analysis of packet flows, even at the upper-layer network device level (e.g., at the distribution layer). By allowing spanning at the upper-layer network device level, a greater number of packet flows are available for analysis, than would be available at a given lower-layer network device.

Embodiments of the present invention also protect the substantial investment made in lower-layer network devices, by moving the hardware and software that might well be subject to upgrades, into the upper-layer network devices. For example, in the situation in which an access layer network device of the prior art would require replacement, an access layer network device according to the present invention would not need replacement because the functionality being replaced would instead be situated in its corresponding distribution layer network device. In a network architecture according to the present invention, then, the distribution layer network device might be replaced (or might simply be upgraded), but the greater majority of devices could remain in place, unchanged. Thus, should certain functionalities become outmoded, be superceded or otherwise change, only the devices that are relatively small in number need be modified or replaced, while the devices that are the largest in number remain untouched.

In addition to simplicity in the management of such a network architecture, the protection of capital investment and the substantial cost savings noted above, network devices according to the present invention significantly reduce the cost of purchasing such systems. Whether measured on a per-port or a per-host basis, or by some other metric, the cost of such systems is significantly lower than those of traditional network architectures. This advantage flows from moving lower-layer functionality into the upper-layer network device, thereby causing such functions to become more centralized. Instead of the cost of the hardware and software for such functionality being replicated in each lower-layer network device (and so, being spread over a relatively small number of ports), the functionality is implemented only once (in the upper-payer network device), and so the cost of the requisite hardware and software can then be spread over multiple lower-layer network devices (and so, for example, a relatively large number of ports or hosts).

A network architecture according to the present invention also provides the option of placing a given server at a point in the network at which the server can be most easily accessed. Because such a network architecture provides the functionality traditionally associated with lower-layer network devices in upper-layer network devices, a server can be directly coupled to an upper-layer network device. This provides several benefits. First, any concerns regarding the load placed on the lower-layer network device coupled to the server are allayed, because there is no need to employ a lower-layer network device in providing network access to the server (the server is able to communicate directly with the upper-layer network device). Second, any concerns regarding the possibility of a failure in such a lower-layer network device resulting in the server becoming inaccessible are similarly allayed. Moreover, because the traditional method of using a lower-layer network device to couple a server to the network can still be employed, the network architect now has a wider variety of placement options within the network architecture for a given server. This allows the network architect can balance the foregoing issues with the need of users to have easy access to the server.

It is important to note that the techniques discussed herein are applicable as between any two layers of a network architecture. While certain of the descriptions provided herein are in terms of access layer network devices and distribution layer network devices, it will be appreciated that such nomenclature is purely exemplary in nature. As will also be appreciated, the techniques described herein can be implemented in more than two layers of a network architecture, as well.

Example Network Architectures

Figure 3:
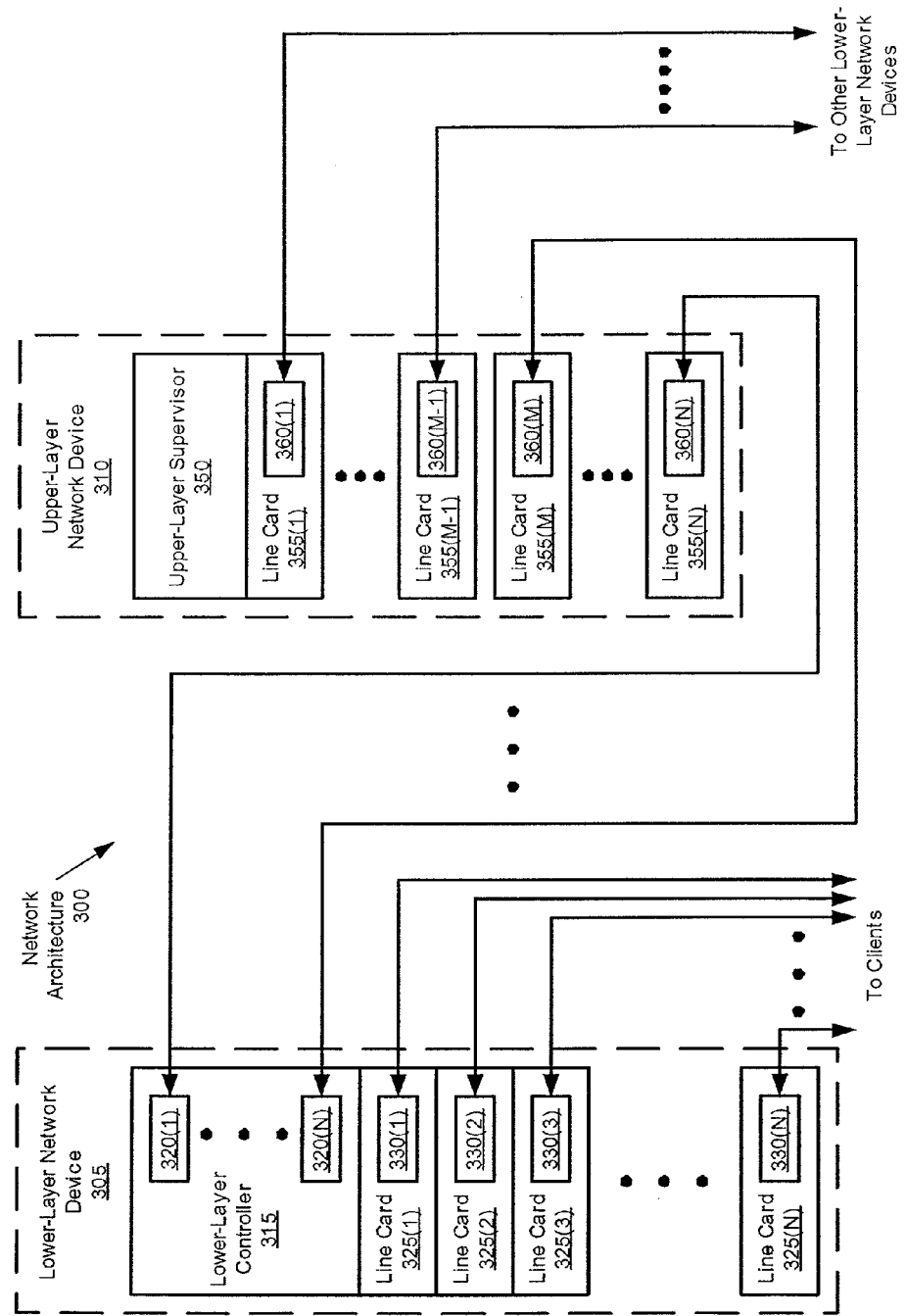
FIG. 3 is a block diagram illustrating a network architecture according to embodiments of the present invention.

FIG. 3 is a block diagram illustrating a network architecture 300 according to embodiments of the present invention. Network architecture 300 includes a lower-layer network device 305 and an upper-layer network device 310. Lower-layer 305 couples a number of clients (e.g., host network devices) to one or more upper-layer network devices (e.g., upper-layer network device 310). Upper-layer network device 310 can couple a number of lower-layer network devices (e.g., lower-layer network device 305) to one another, as well as to other upper-layer network devices and other networking devices within the networking hierarchy of which network architecture 300 is a part. Lower-layer device 305 includes a lower-layer controller 315. In turn, lower-layer controller 315 includes a number of ports (depicted in FIG. 3 as controller port 320(1)-(N)). Lower-layer network device 305 also includes a number of line cards (depicted in FIG. 3 as line cards 325(1)-(N)), which are under the control of lower-layer controller 315 and which include a corresponding one of line card ports 330(1)-(N). Line card ports 330(1)-(N) provide communication with the clients to which lower-layer network device 305 is coupled. Each of the clients communicates with a corresponding one of line cards 325(1)-(N), which in turn communicate with lower-layer controller 315. Lower-layer controller 315 then communicates with upper-layer network device 310 via controller ports 320(1)-(N).

In turn, upper-layer network device 310 includes an upper-layer supervisor 350, which controls a number of line cards (depicted in FIG. 3 as line cards 355(1)-(N)) to which lower-layer network device 305 is coupled. Each of line cards 355(1)-(N) includes a line card port (depicted in FIG. 3 as line card ports 330(1)-(N)). As can be seen, controller ports 320(1)-(N) of lower-layer controller 315 are each coupled to a corresponding one of line cards ports 360(M)-(N) of upper-layer network device 310. As will be appreciated, upper-layer network device 310 will typically be coupled to a number of lower-layer network devices, and so its line card ports (e.g., line card ports 360(1)-(M−1)) will be coupled to other lower-layer network devices that upper-layer network device 310 is intended to support.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist.

The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4:
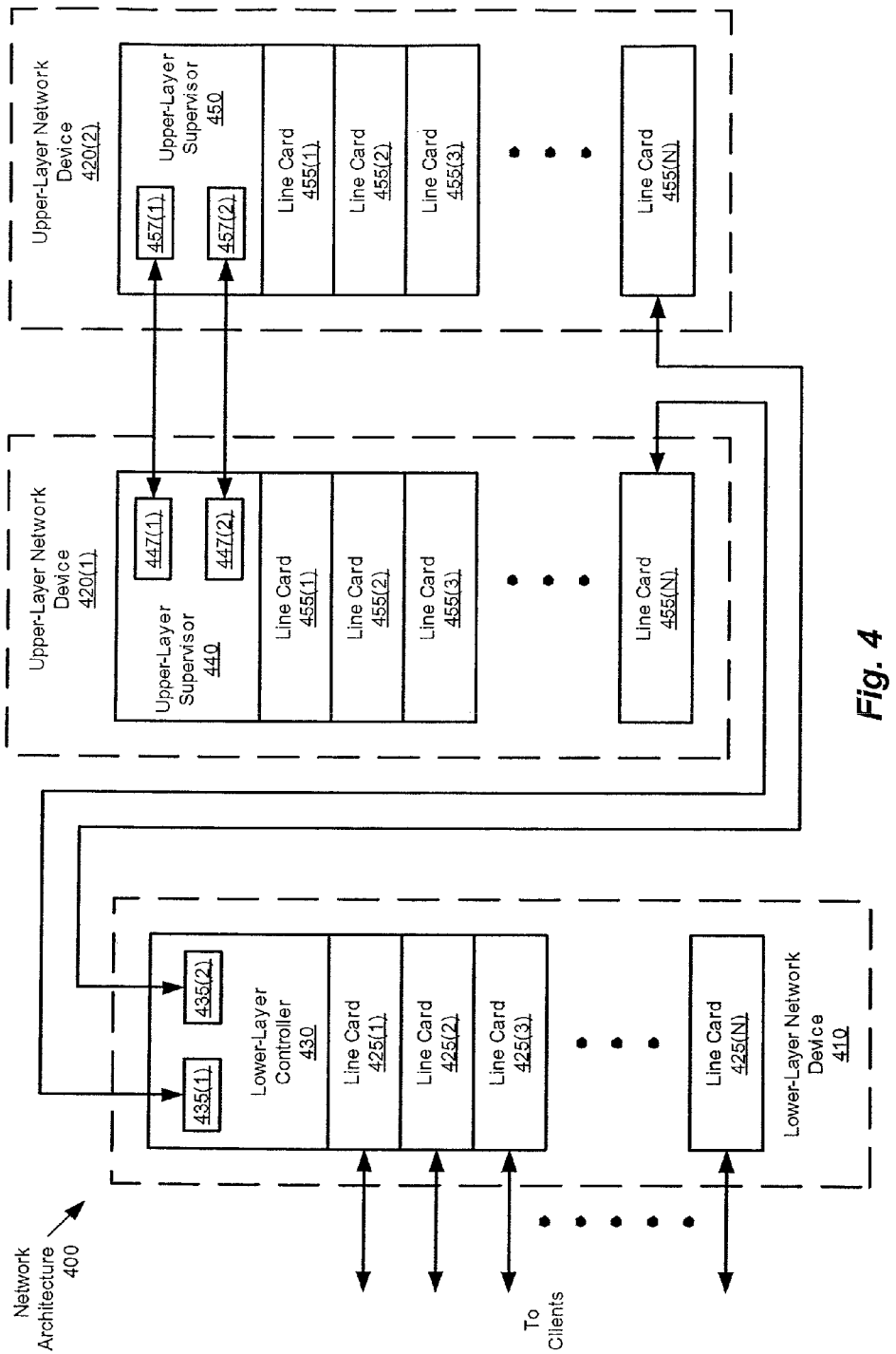
FIG. 4 is a block diagram illustrating a network architecture according to embodiments of the present invention that provides redundancy.

FIG. 4 is a block diagram illustrating a network architecture 400 according to the present invention in which a lower-layer controller 410 is coupled to two upper-layer network devices (depicted in FIG. 4 as upper-layer network devices 420(1) and 420(2)), which provide redundancy, and so greater reliability. As before, in the case of network architecture 300, lower-layer network device 410 includes a number of line cards (depicted in FIG. 4 as line cards 425(1)-(N)), which are controlled by a lower-layer controller 430. As before, line cards 425(1)-(N) provide connectivity between lower-layer network device 410 and a number of clients (e.g., host network devices). Also as before, lower-layer controller 430 controls communications with these clients via control of line cards 425(1)-(N). Lower-layer controller 430 is shown as including two controller ports (depicted in FIG. 4 as controller ports 435(1)-(2)), which provide for communications with upper-layer network devices 420(1)-(2). It will be appreciated, however, that more than one controller port can be used to provide connections to a given upper-layer network device (and thereby provide redundancy).

Upper-layer network devices 420(1)-(2) each include a number of elements. Upper-layer network device 420(1) includes an upper-layer supervisor 440, which controls a number of line cards (depicted in FIG. 4 as line cards 445(1)-(N)). Upper-layer supervisor 440 also includes two supervisor ports 447(1)-(2), which support communications between upper-layer network device 420(1) and upper-layer network device 420(2). Similarly, upper-layer network device 420(2) includes upper-layer supervisor 450, which controls a number of line cards (depicted in FIG. 4 as line cards 455(1)-(N)). Upper-layer supervisor 450 supports communications between upper-layer network device 420(2) and upper-layer network device 420(1) via supervisor ports 457(1)-(2). Returning to the discussion of communications between lower-layer network device 410 and upper-layer network devices 420(1)-(2), lower-layer network device 410 is coupled via its controller ports 435(1)-(2) to line card 445(N) of upper-layer network device 420(1) and line card 455(N) of upper-layer network device 420(2), respectively. Redundancy is provided by the communications that occur between upper-layer network device 420(1) and upper-layer network device 420(2), which allow either of upper-layer network devices 420(1)-(2) to take over the other's duties, should a failure occur. Such communications are made possible by communications between upper-layer supervisor 440 and upper-layer supervisor 450 (over the connections provided by supervisor ports 447(1)-(2) and 457(1)-(2)).

Figure 5A:
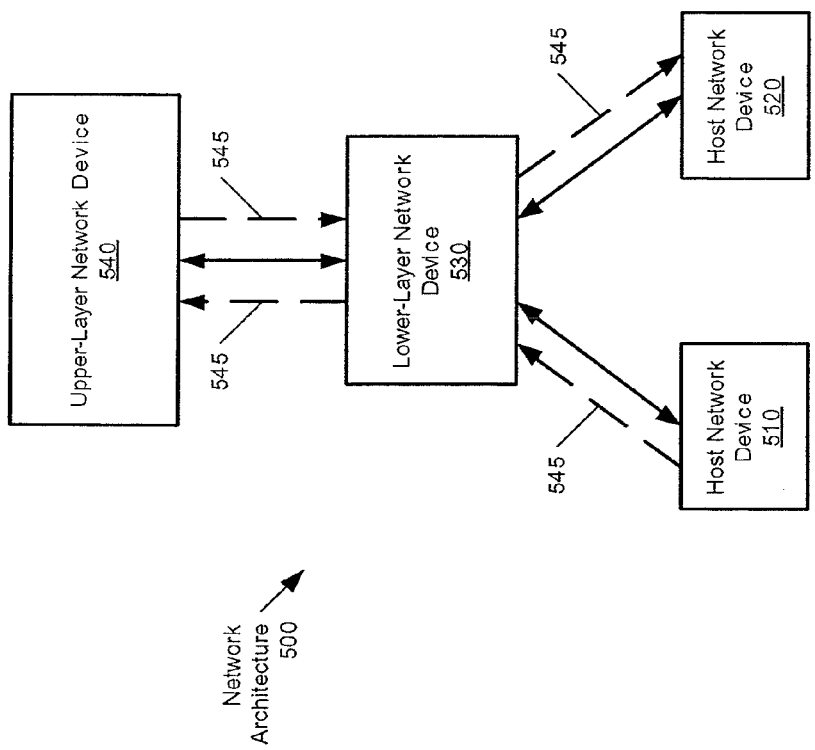
FIG. 5A is a block diagram illustrating packet flow in a single-level network architecture according to embodiments of the present invention.

FIG. 5A is a block diagram illustrating packet flow in a single-level network architecture according to the present invention. FIG. 5A depicts a network architecture 500 that includes host network devices 510 and 520, a lower-layer network device 530 and an upper-layer network device 540. Network connections couple host network devices 510 and 520 to lower-layer network device 530, and in turn, a network connection couples lower-layer network device 530 and upper-layer network device 540. In contrast to existing architectures, a packet requiring certain lower-layer protocol processing traverses a path (depicted in FIG. 5 as a path 545) that takes the packet from host network devices 510, through lower-layer network device 530, to upper-layer network device 540, which is now tasked with performing such lower-layer protocol processing (e.g., the determination that the packet is destined for host network device 520). Once the requisite lower-layer protocol processing has been performed by upper-layer network device 540, the packet is then directed to lower-layer network device 530, and finally to host network device 520. This is in contrast to existing approaches, in which (in terms of the elements of FIG. 5A) a packet would only follow a path from host network device 510 through lower-layer network device 530 to host network 520, thus bypassing upper-layer network device 540.

Thus, in contrast to existing approaches, an upper-layer network device of the present invention is tasked with performing certain (or all) packet processing traditionally associated with lower-layer network devices (i.e., lower-layer protocol processing). This will typically be in addition to the upper-layer protocol processing traditionally performed by the upper-layer network device. However, this, too, can be addressed by the present invention. This is because techniques of the present invention can be applied to more than two network layers in a given network. In the posited scenario, the upper-layer network device is relieved of some or all of its responsibilities for upper-layer protocol processing by pushing those responsibilities up to the next layer (i.e., towards the network core). In such a case, the upper-layer network device (and its associated upper-layer protocol processing) is treated as the "lower-layer network device," and the device above (i.e., closer to the network core) is treated as the "upper-layer network device." Some or all of the erstwhile upper-layer protocol processing is thus moved closer to the network core, providing the aforementioned benefits to multiple layers of a network. It will also be appreciated that, in fact, techniques of the present invention can be applied with equal success to the server side of a network. A fundamental concept of the present invention is the shifting of lower-layer protocol processing (at whatever layer that lower-layer protocol processing is traditionally performed) towards the network core, which provides the simplification, efficiency and other benefits previously discussed.

Figure 5B:
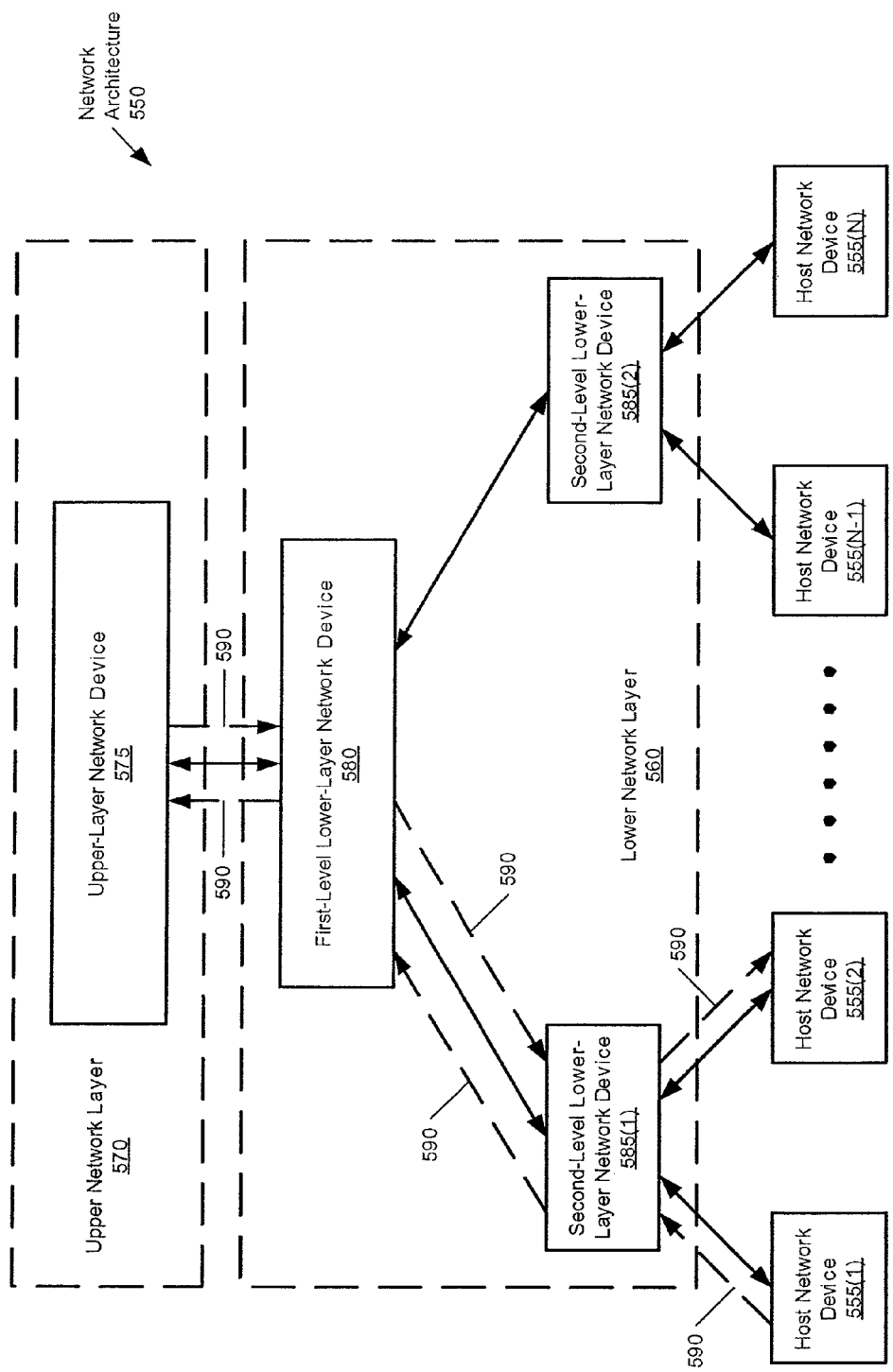
FIG. 5B is a block diagram illustrating packet flow in a multiple-level network architecture according to embodiments of the present invention.

FIG. 5B is a block diagram illustrating packet flow in a multiple-level network architecture according to the present invention. FIG. 5B depicts a network architecture 550, which includes a number of host network devices (depicted in FIG. 5B as host network devices 555(1)-(N)), a number of devices in a lower network layer 560 and a device (possibly of several) in an upper network layer 570. The devices in upper network layer 570 include an upper-layer network device 575, among other such devices. Lower network layer 560 includes a first-level lower-layer network device 580, which is coupled to upper-layer network device 575, and so permits communications thereby. First-level lower-layer network device 580 is, in turn, coupled to second-level lower-layer network devices 585(1)-(2). Second-level lower-layer network devices 585(1)-(2) couple host network devices 555(1)-(N) to first-level lower-layer network device 580.

In the manner of network architecture 500, a packet in network architecture 550 that is to be sent from host network device 555(1) to host network device 555(2) follows a path 590 through lower network layer 560 and upper network layer 570. The packet is first sent from host network device 555(1) to second-level lower-layer network device 585(1). Rather than now being sent directly to host network device 555(2) by second-level lower-layer network device 585(1), the packet is sent along path 590 to first-level lower-layer network device 580, and then to upper-layer network device 575. Upper-layer network device 575 determines the manner in which the packet should be handled from that point, onward. In this case, upper-layer network device 575 determines that the packet is destined for host network device 555(2), and so arranges for such forwarding to take place. The packet is thus sent from upper-layer network device 575 to first-level lower-layer network device 580, and, in turn, to second-level lower-layer network device 585(1). From second-level lower-layer network device 585(1), the packet is sent to its destination (host network device 555(2)). The path that this packet has taken (path 590) clearly illustrates the approach taken by the present invention, which is to push packet processing further into the network's architecture.

A network architecture such as network architecture 550 allows greater flexibility in the data rates, protocols, connections and other functionality provided within network architecture 550. For example, second-level lower-layer network devices 585(1)-(2) can each support different data rates, allowing the appropriate communications with their respective host network devices, yet still support the same data rate in their respective uplinks. However, were this data rate a relatively moderate data rate, such a data rate could be less than that supported by upper-layer network device 575, making communication with upper-layer network device 575 less efficient than might otherwise be achieved. Thus, first-level lower-layer network device 580 can act as an intermediary, providing moderate data rate communications with second-level lower-layer network devices 585(1)-(2), while providing high data rate communications with upper-layer network device 575.

As will be appreciated, network architecture 550 also demonstrates the application of the present invention to multiple layers in a network architecture. The present invention can be implemented in as uplinks between second-level lower-layer network devices 585(1)-(2) and first-level lower-layer network device 580, as well as between first-level lower-layer network device 580 and upper-layer network device 575.

Figure 6:
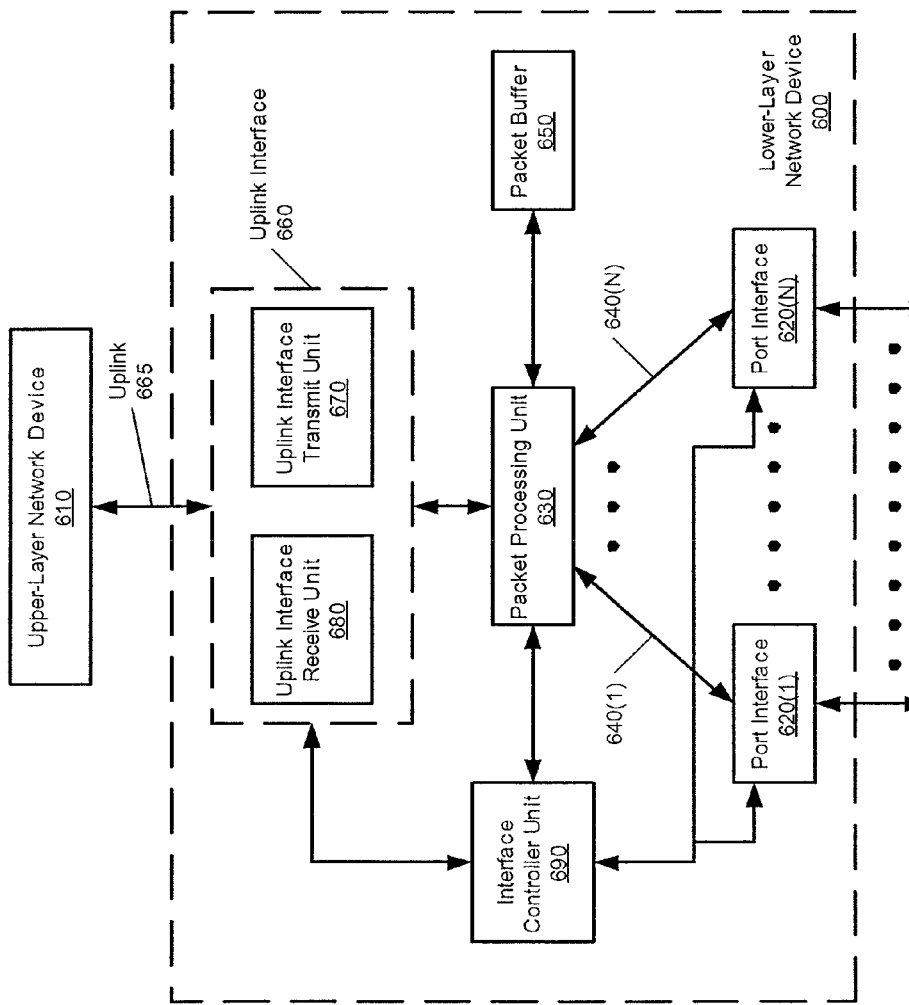
FIG. 6 is a block diagram illustrating an architecture of a lower-layer network device according to embodiments of the present invention.

FIG. 6 is a block diagram illustrating the architecture of a lower-layer network device according to the present invention. FIG. 6 depicts a lower-layer network device 600 coupled to an upper-layer network device 610. Lower-layer network device 600 communicates with clients such as host network devices via a number of port interfaces (depicted in FIG. 6 as port interfaces 620(1)-(N)). Lower-layer network device 600 receives packets from the clients at port interfaces 620(1)-(N) and sends these packets to a packet processing unit 630 via internal communication channel 640(1)-(N). Packet processing unit 630 is coupled to a packet buffer 650, which allows packets received from port interfaces 620(1)-(N) to be buffered prior to processing (e.g., in a case in which packet processing unit 630 receives more packets than can be processed in a given period of time).

In one embodiment, packet buffer 650 is fragmented into fixed amount of memory called a packet buffer unit (PBU). Each entry in the free list (the list of free blocks that are available for use in buffering packets) points directly or indirectly to a PBU. Possible schemes include:

a circular free list; the content of the entry points to a PBU, and a linked free list; the address of the entry points to a PBU.

Incoming packets are stored to packet buffer 650 by deleting one or more (packet length >PBU) entries from the free list and inserting one (linked free list) or all (circular free list) pointers into the appropriate queue (discussed subsequently). Outgoing packets are fetched from the packet buffer by deleting one or more (packet length >PBU) entries from the queue and inserting back one (linked free list) or all (circular free list) pointers into the free list. Both techniques support multicasting, by duplicating the packet pointer into each destination queue (rather than the packet's entire contents). Multicast packets are copied once into the packet buffer while the reference count (number of ports) is updated in a dedicated multicast table. The reference count drops to zero when all ports have sent the multicast packet, causing the pointer(s) to be pushed back into the free list. Each multicast table entry maps directly to the shared packet buffer versus using a set of head and tail pointers to prevent entry-blocking. Another benefit provided by such a scheme is that packets are written in "parallel" to the packet buffer. Hence, this scheme is well suited for an output-queue-based architecture, to avoid head-of-line blocking. It will be appreciated that, in fact, packet buffering can be made optional, such that packets flow directly through packet processing unit 630.

Packet processing unit 630 passes processed packets to an uplink interface 660. Uplink interface 660 sends packets to, and receives packets from, upper-layer network device 610 via an uplink 665. Uplink interface 660, in one embodiment, includes an uplink interface transmit unit 670, which provides for the transmission of packets from lower-layer network device 600 to upper-layer network device 610 via uplink 665. Uplink interface 660 also includes an uplink interface receive unit 680, which provides for the reception of packets from upper-layer network device 610 by lower-layer network device 600 via uplink 665. Lower-layer network device 600 also includes an interface controller unit 690, which controls each of port interfaces 620(1)-(N), packet processing unit 630 and uplink interface 660.

Figure 7:
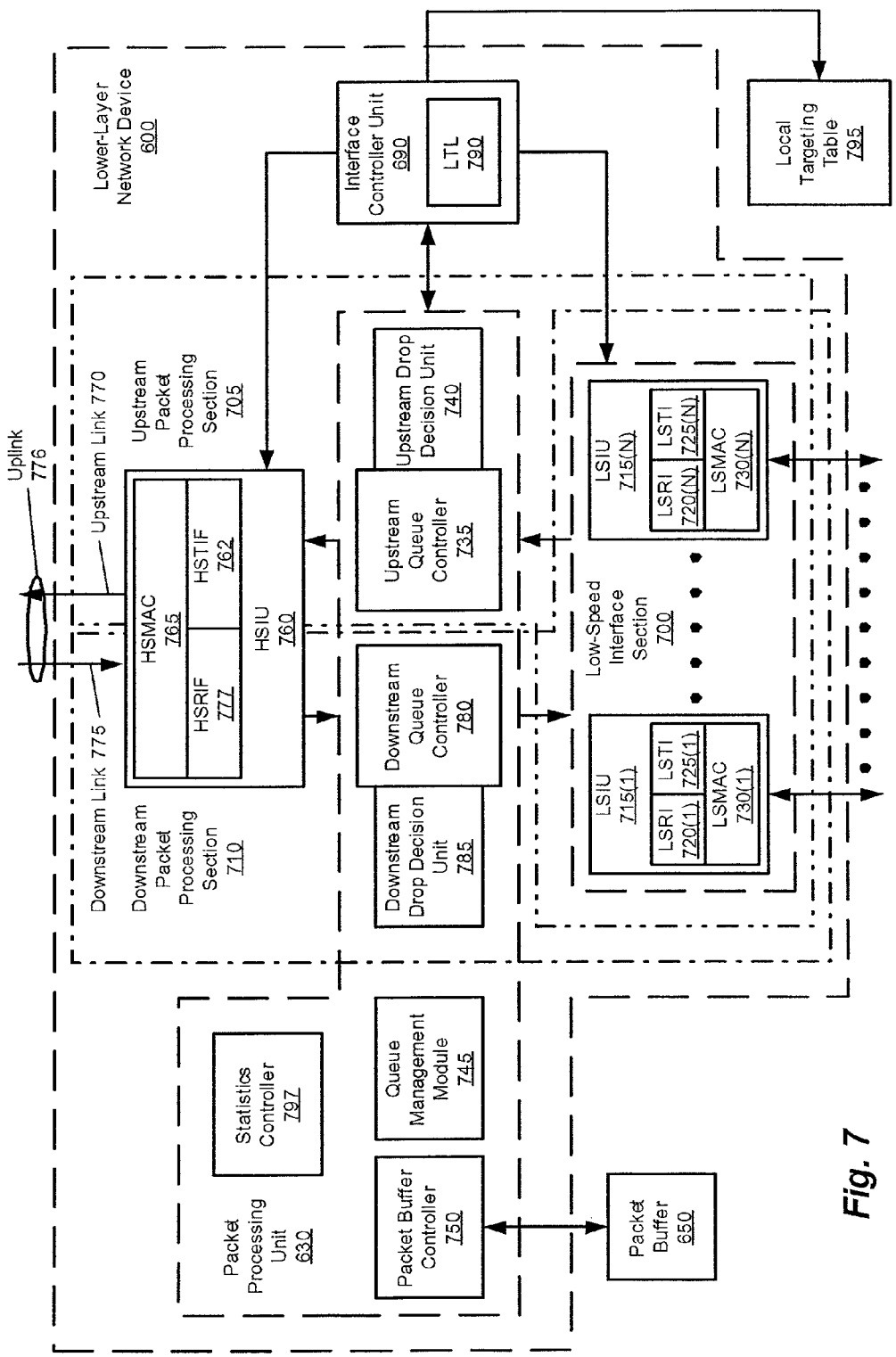
FIG. 7 is a block diagram illustrating an architecture of a lower-layer network device according to embodiments of the present invention in greater detail.

FIG. 7 is a block diagram illustrating the architecture of lower-layer network device 600 in greater detail. As depicted in FIG. 7, lower-layer network device 600 includes four major sections, some of which overlap one another. Lower-layer network device 600 includes a low-speed interface section 700, an upstream packet processing section 705 and a downstream packet processing section 710, as well as packet processing unit 630. As can be seen in FIG. 7, upstream packet processing section 705 includes portions of low-speed interface section 700 and packet processing unit 630. Similarly, downstream packet processing section 710 includes sections of low-speed interface unit 700 and packet processing unit 630.

Low-speed interface unit 700 interfaces lower-layer network device 600 with the clients to which lower-layer network device 600 provides networking services. Low-speed interface section 700 includes a number of low-speed interface units (depicted in FIG. 7 as low-speed interface units 715(1)-(N)). Each of low-speed interface units 715(1)-(N)

includes a low-speed receive interface (one of low-speed receive interfaces 720(1)-(N)) and a low-speed transmit interface (one of low-speed transmit interfaces 725(1)-(N)), which are in turn coupled to a low-speed media access control (one of low-speed media access controllers 730(1)-(N)). As will be appreciated, each of low-speed receive interfaces 720(1)-(N) are considered to be part of upstream packet processing section 705; likewise, each of low-speed transmit interfaces 725(1)-(N) are considered to be parts of downstream packet processing section 710.

Low-speed interface section 700 provides packets received by low-speed interface unit 715(1)-(N) to packet processing 630. As depicted in FIG. 7, packet processing unit 630 includes an upstream queue controller 735 coupled to an upstream drop decision unit 740. Upstream queue controller 735 and upstream drop decision unit 740 operating conjunction with a queue management module 745, which manages queues maintained in packet buffer 650. Queue management module 745 interfaces with packet buffer 650 via a packet buffer controller 750.

In one embodiment of lower-layer network device 600, three queues are maintained in packet buffer 650 when queuing is required (whether input or output): voice data queue, high-priority data queue and low-priority data queue. These queues can be either static or dynamic (linked list). Packets can be enqueued, for example, based on their class-of-service, and dequeued according to an arbitration algorithm that selects between the three queues. Software assigns a rate limit for each queue through a byte credit. When a queue consumes all credits or becomes empty, the arbiter switches to the next queue in priority order. The queues' priorities are in the following order (highest to lowest): voice data queue, high-priority data queue and low-priority data queue. Should a packet be enqueued in the previous higher-priority queue, the arbiter switches back to that queue if the queue has not already consumed all its credits (credits can be reinitialized on a regular basis, for example). If all credits are consumed before being reinitialized, non-empty queues are served according to a simple round robin arbitration scheme, on a per-packet basis.

In conjunction with upstream queue controller 735 and queue management module 745, upstream drop decision unit 740 makes a determination as to whether a packet should be dropped. This decision is based on information from upstream queue controller 735 and queue management module 745 indicating that one or more queues in packet buffer 650 are unable to store further packets at the given point in time.

In the upstream direction, as part of upstream packet processing section 705, packet processing unit 630 passes packets to a high speed interface unit 760. High-speed interface unit 760 includes a high-speed transmit interface 762, which passes packets to a high-speed media access controller 765 for transmission over an upstream link 770. Lower-layer network device 600 receives packets from an upper-layer network device (e.g., upper-layer network device 610) via a downstream link 775. Together, upstream link 770 and downstream link 775 form an uplink 776. Packets are received from downstream link 775 by high-speed media access controller 765, and are then passed to a high-speed receive interface 777, which is an element of high-speed interface unit 760. Packets thus received are then provided to packet processing unit 630 at a downstream queue controller 780. Downstream queue controller 780 and a downstream drop decision unit 785 operate with queue management module 745 and packet buffer controller 750 to maintain the appropriate downstream queues within packet buffer 650. Packet processing unit 630 then provides the packets from the queues within packet buffer 650 to low-speed interface section 700, and in particular, the appropriate one of low-speed interface units 715(1)-(N). This low-speed interface unit sends the packet to the appropriate client via its low-speed transmit interface and low-speed media access controller.

As before, lower-layer network device 600 includes an interface controller unit 690, which controls the operations performed within lower-layer network device 600. As depicted in FIG. 7, interface controller unit 690 includes local targeting logic (LTL) 790, which employs a local targeting table 795 in controlling the processing of packets received and transmitted by lower-layer network device 600. LTL 790 is used to allow processing of packets based on the packets' local port index (or more simply, port index). Typically, in fact, the port index includes a source port index and a destination port index, which are employed to identify the source port and the destination port of the packet in question (as discussed subsequently in connection with an example of a packet format that is used in certain embodiments of the present invention).

In operation, LTL 790 uses port index information stored in local targeting table 795, in order to determine how the packet should be handled by the lower-layer network device, in light of the manner in which the packet will be handled by the upper-layer network device. For example, the logical port index (LPI) information is typically used to map a packet's LPI to the actual port of the lower-layer network device from/to which the packet is received/destined (the packet's source port index and destination port index, respectively). The upper-layer network device associated with the given lower-layer network device determines the LPI information that is needed, and downloads this information via the appropriate uplink. This information also allows the lower-layer network device to make simple packet handling determinations, such as blocking a packet destined for its own source port. As will be appreciated, any packet handling capabilities provided by LPI information is very limited, because the original functionality provided by the lower-layer network device is now moved into the upper-layer network device.

The responsibility of the LTL 790 is to issue port selects to the ports residing on the given lower-level network device. Operations performed by LTL 790 begin with the receipt of a packet. All ports, as well as the lower-layer network device's packet processing unit, receive the packet. The packet processing unit determines the destination of the packet and sends an index to the elements receiving the packet. The index from the packet processing unit can be, for example, an encoded address containing information about the ports for which the packet is destined. This index can contain information on one or more ports (LPIs). A valid index is recognized by LTL 790 once the requisite look-up has been performed in local targeting table 795. LTL 790 decodes this index to yield the port select mask(s). Port select masks are then output from the memory containing the information whether or not a port is selected. Finally, the port select logic takes the port mask and generates the port select(s). Aside from selecting the targeted ports, LTL 790 also handles the read/write cycles of interface controller unit 690 to local targeting table 795. This allows interface controller unit 690 to initialize and update local targeting table 795. This read/write operation should occur only when a look-up operation is not occurring. LTL-related operations should always have higher priority over a LCP read/write cycle.

Packet processing unit 630 also includes a statistics controller 797 that maintains statistics regarding the packets conveyed by and flows through lower-layer network device 600.

This allows lower-layer network device 600 to track at least a modicum of statistics, including front-end statistics and quality-of-service (QoS) statistics.

Figure 8:
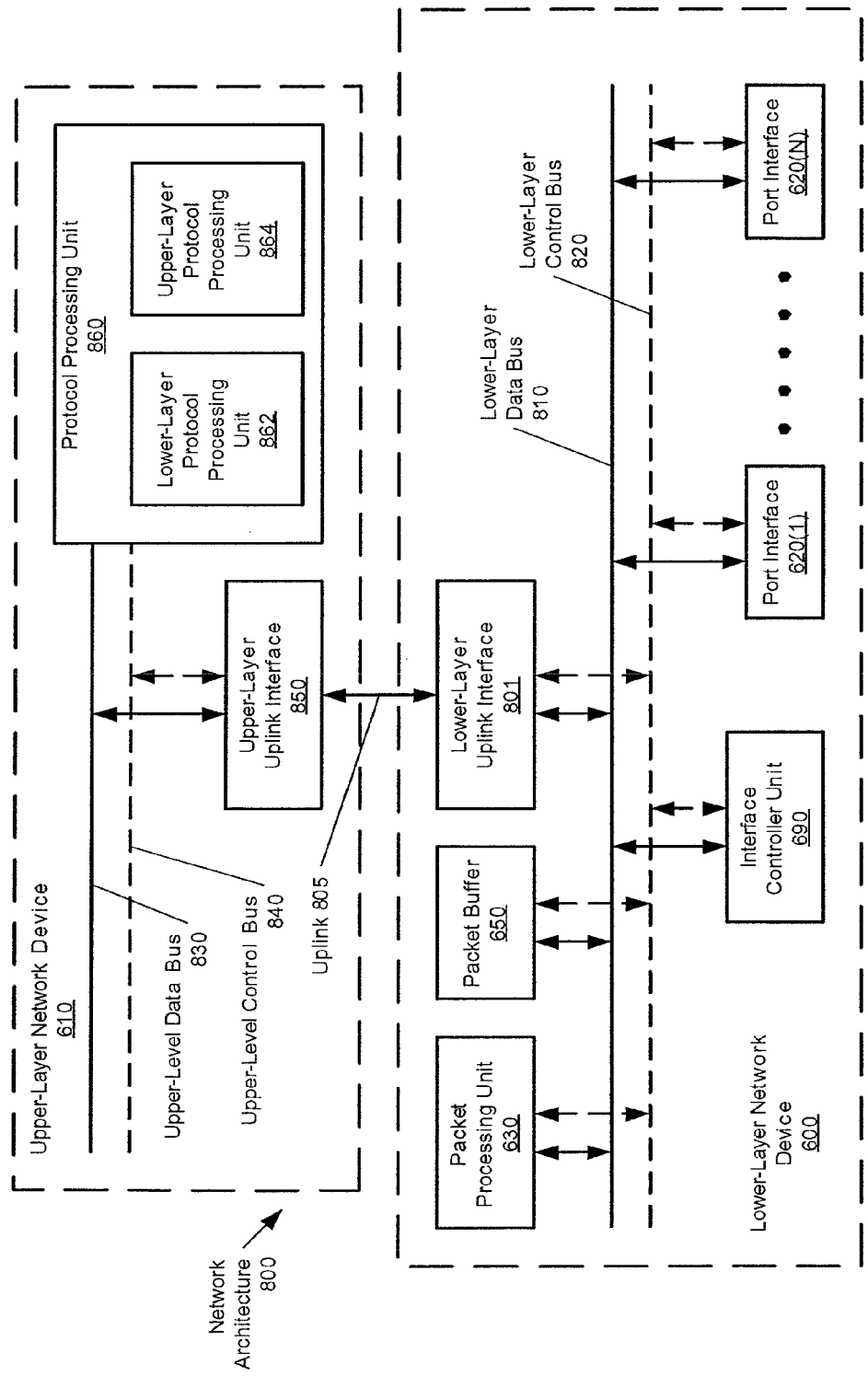
FIG. 8 is a block diagram illustrating a more specific architecture of a lower-layer network device according to embodiments of the present invention.

FIG. 8 is a block diagram illustrating a network architecture 801, such as that shown in FIGS. 6 and 7. In the architecture depicted in FIG. 8, lower-layer network device 600 again includes a number of port interfaces (port interfaces 620(1)-(N)), a packet processing unit (packet processing unit 630), a packet buffer (packet buffer 650) and an interface controller (interface controller unit 690). Lower-layer network device 600 is also depicted as including lower-layer uplink interface 801, which allows lower-layer network interface 600 to communicate with upper-layer network device 610 via an uplink 805, in the manner of uplink interface 660. As will therefore be appreciated, uplink 805 is an uplink in the manner of uplink 665 of FIG. 6 and uplink 776 of FIG. 7.

In the architecture depicted in FIG. 8, lower-layer network device 600 also includes a lower-layer data bus 810 and a lower-layer control bus 820. This bus-based architecture allows data packets and control information to be passed freely between and among the elements of lower-layer network device 600, in any manner desired that is appropriate to the operation of lower-layer network device 600.

As depicted in FIG. 8, upper-layer network device 610 also employs a bus-based architecture. Upper-layer network device 610 thus includes an upper-layer data bus 830 and an upper-layer control bus 840. Upper-layer data bus 830 and upper-layer control bus 840 couple an upper-layer uplink interface 850 to a protocol processing unit 860. In turn, protocol processing unit 860 includes a lower-layer protocol processing unit 862 and an upper-layer protocol processing unit 864. In the manner noted previously, lower-layer protocol processing unit 862 performs some (or all) of the lower-layer protocol processing traditionally associated with lower-layer network device 600. Upper-layer protocol processing unit 864, on the other hand, performs the upper-layer protocol processing traditionally associated with upper-layer network device 610. However, as also noted earlier, some (or all) of the upper-layer protocol processing traditionally associated with upper-layer network device 610 can be pushed towards the network core, in the manner of the lower-layer protocol processing shifted into upper-layer network device 610.

Upper-layer uplink interface 850 receives packets from and transmits packets to lower-layer network device 600, and allows those packets to be processed by protocol processing unit 860 (and so, lower-layer protocol processing unit 862 and upper-layer protocol processing unit 864). As a result of the inclusion of lower-layer protocol processing unit 862, protocol processing unit 860 can perform not only protocol processing operations typically performed by upper-layer network device 610 (via upper-layer protocol processing unit 864), but also those traditionally performed by a network device in the position of lower-layer network device 600. It will be appreciated that an advantage of the bus architecture depicted in FIG. 8 is the ability to send the requisite information to lower-layer protocol processing unit 862 and upper-layer protocol processing unit 864 in tandem, in order to allow packet processing that can be performed simultaneously, to be thus performed.

An example of the flow of a packet through network architecture is now provided. First, a packet arrives at one of the port interfaces (e.g., port interface 620(1)). The destination will be taken to be lower-layer uplink interface 801, so that the packet will be sent to upper-layer network device 610 via uplink 805. The packet is then sourced onto lower-layer data bus 820 by port interface 620(1), after the appropriate data bus header information has been prepended. The packet is then processed by interface controller unit 690. If necessary, the packet is buffered in packet buffer 650 by packet processing unit 630. When the packet is ready to be sent to upper-layer network device 610, the packet is sent to lower-layer uplink interface 801, which encapsulates the packet (e.g., in the manner discussed subsequently in connection with FIG. 12). The encapsulated packet is then sent over uplink 805 to upper-layer network device 610. The packet is then received by upper-layer uplink interface 850, which decapsulates the packet.

Protocol processing unit 860 receives the decapsulated packet from upper-layer uplink interface 850 via upper-level data bus 830. Lower-layer protocol processing is then performed on the packet by lower-layer protocol processing unit 862, in accordance with the lower-layer protocol information contained in the packet. Also at this point, upper-layer protocol processing unit 864 can perform upper-layer protocol processing on the packet, in accordance with the upper-layer protocol information contained in the packet, if necessary. For example, in an OSI protocol environment, lower-layer protocol processing unit 862 can be configured to perform data link layer processing (L2 processing (switching)), and upper-layer protocol processing unit 864 configured to perform network layer processing (L3 processing (routing)). In such a scenario, lower-layer protocol processing unit 862 can be implemented in the manner of a forwarding engine. The foregoing packet processing includes a determination as to the appropriate destination port index (i.e., the LPI of the destination port) to which the packet is to be sent, allowing the packet to be handled properly. If the source index was not already "known" to protocol processing unit 860, protocol processing unit 860 causes this information to be stored.

Once the appropriate packet processing has been performed, protocol processing unit 860 sends the packet to upper-layer uplink interface 850 via upper-level data bus 830. Upper-layer uplink interface 850 then encapsulates the packet. In doing so, upper-layer uplink interface 850 performs an LTL table lookup on the destination index, in order to determine the destination of the packet. The LTL result contains the uplink port bit set and hence the packet is received and forwarded on uplink 805. The encapsulated packet is then received by lower-layer uplink interface 801, which decapsulates the encapsulated packet. The packet is then sent to packet buffer 650, under the control of interface controller unit 690, which then directs the packet to its destination, based on its destination index (e.g., port interface 620(N)), once the destination port is able to take the packet. The packet is then forwarded to the host connected to that port.

Figure 9:
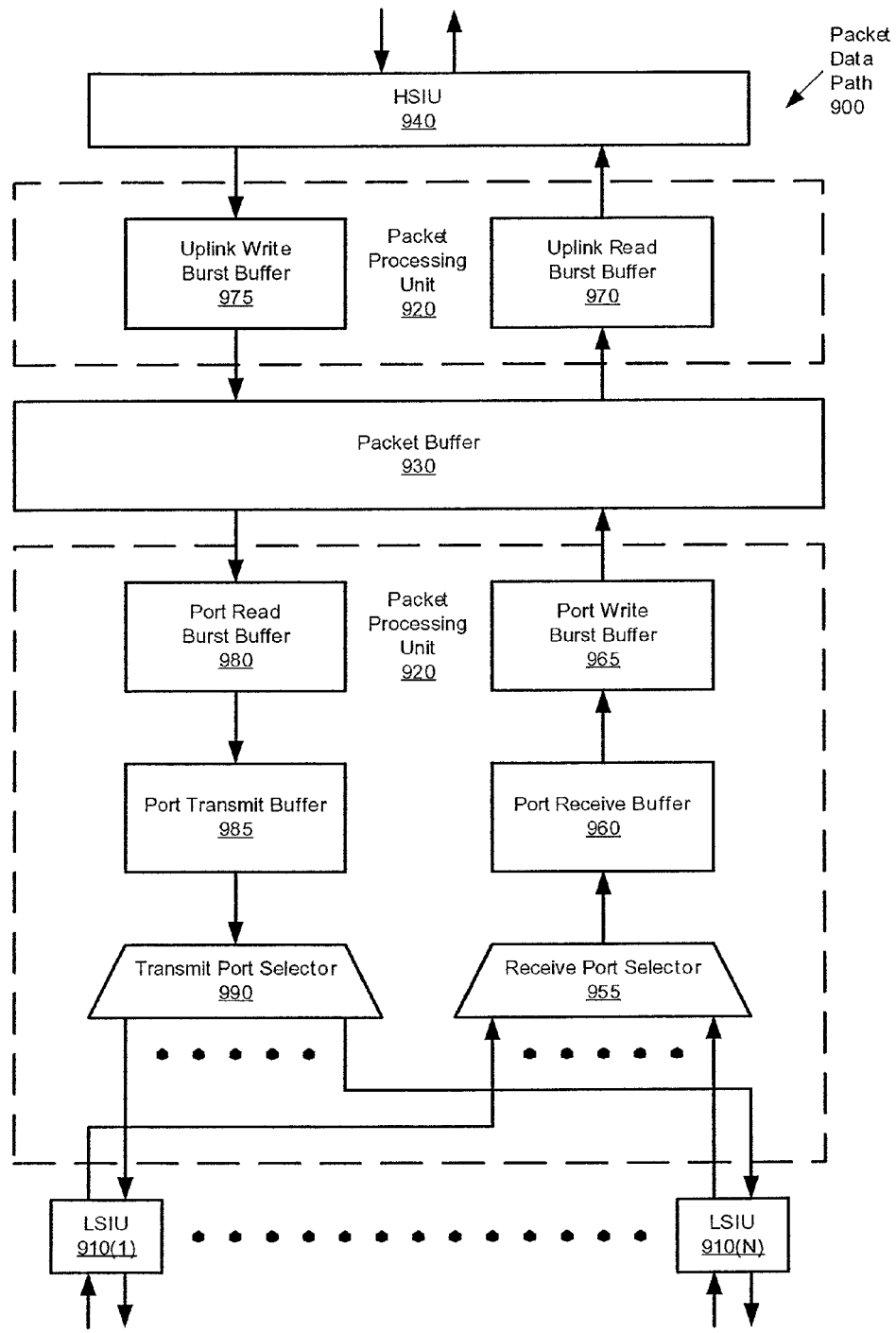
FIG. 9 is a block diagram illustrating packet flow in a lower-layer network device according to embodiments of the present invention in greater detail.

FIG. 9 is a block diagram illustrating packet flow (a packet data flow 900) in a lower-layer network device according to the present invention. A packet is received at one of a number of low-speed interface units 910(1)-(N). Low-speed interface units 910(1)-(N) are these such as low-speed interface unit 715(1)-(N) of FIG. 7. A packet thus received is then provided to a package processing unit 920, which is the same as or similar to packet processing unit 630 of FIG. 6. Packet processing unit 920 provides packets to a packet buffer 930 (which is comparable to packet buffer 650 of FIG. 6). Packets are passed from packet buffer 930 back to packet processing unit 920, where they are buffered in preparation for transmission to an upper-layer network device (not shown) by a high-speed interface unit 940 (which is comparable to high-speed interface unit 760 of FIG. 7). High-speed interface unit 940 also receives packets from an upper-layer network device (either the same one, a different one), and provides these packets to packet processing unit 920 for buffering. Packet processing unit 920 then passes the packet (received by high-speed interface unit 940 from the upper-layer network device) to packet buffer 930, to where the packet is stored. Packet buffer 930 then passes the packet back to packet processing unit 920, which in turn, passes the packet to an appropriate one of low-speed interface units 910(1)-(N). This process is now discussed in greater detail.

A packet received by one of low-speed interface units 910(1)-(N) is received by packet processing unit 920 via the selection of the given one of low-speed interface units 910(1)-(N) by a received port selector 955. Receive port selector 955 can be implemented using, for example, a multiplexer. Once the appropriate one of low-speed interface units 910(1)-(N) is selected, and the packet in question taken into packet processing unit 920, the packet is buffered in a port receive buffer 960. When the packet is ready to be written to packet buffer 930, the packet is transferred to a port write burst buffer 965. Port write burst buffer 965 writes the packet in question into packet buffer 930 at high speed. Similarly, when the packet is ready to be read from packet buffer 930, an uplink read burst buffer 970 reads the packet from packet buffer 930 and provides the packet to high-speed interface unit 940, for transmission to the upper-layer network device.

Conversely, a packet received by high-speed interface unit 940 from an upper-layer network device is written into packet buffer 930 via an uplink write burst buffer 975. As with uplink read burst buffer 970, uplink write burst buffer 975 is capable of writing the packet's information into packet buffer 930 at high speed. When packet processing unit 920 is ready to read the packet from packet buffer 930, a port read burst buffer 980 performs such a read operation. As with port write burst buffer 965, port read burst buffer 980 is capable of performing such read operations at high speed. Port read burst buffer 980 then provides the packet to a port transmit buffer 985. Port transmit buffer 985 buffers the packet until such time as the packet is ready for transmission via an appropriate one of low-speed interface units 910(1-N). At that time, a transmit port selector 990 selects the appropriate one of low-speed interface units 910(1-N), and the packet in question is provided thereto.

Figure 10:
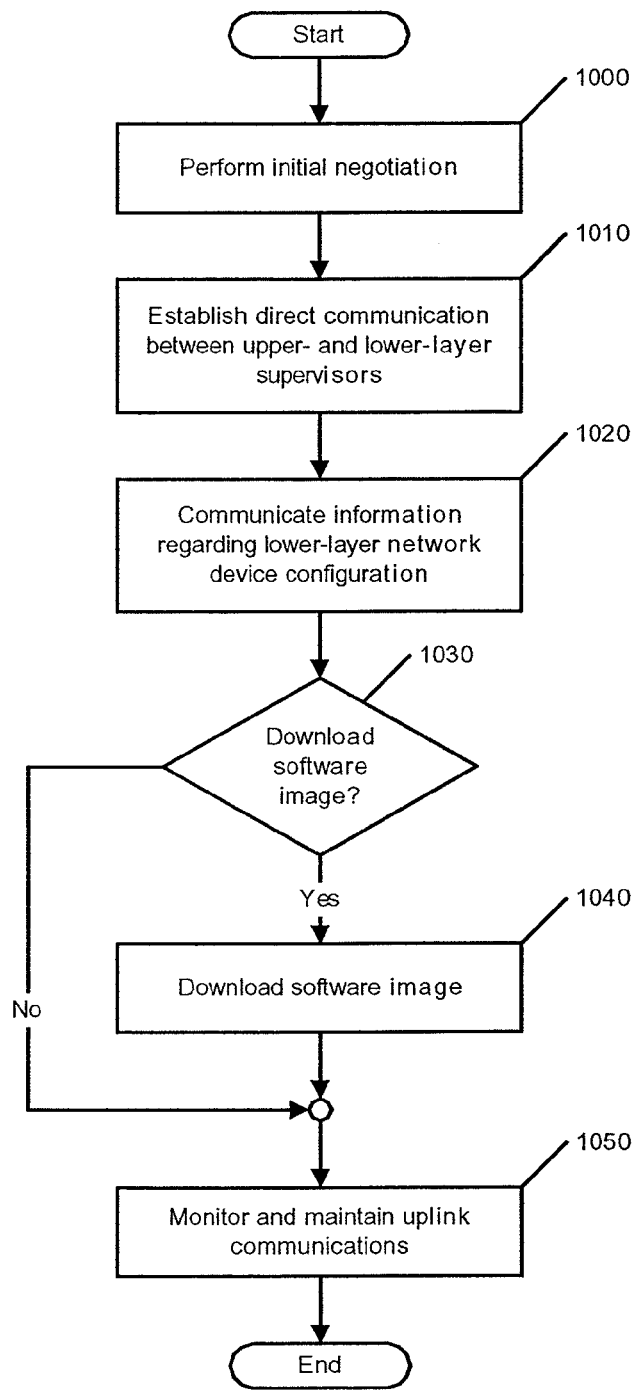
FIG. 10 is a flow diagram illustrating an example of the process of initialization of a network architecture according to embodiments of the present invention, and more specifically, the initialization of a lower-layer network device of the present invention.

An Example of the Operation of an Architecture According to the Present Invention FIG. 10 is a flow diagram illustrating an example of the process of initialization of a network architecture according to the present invention, and in particular, the initialization of a lower-level network device thereof. The process begins with an initial negotiation being performed (step 1000). Direct communications are then established between a supervisor of an upper-layer network device and a supervisor of the lower-layer network device (step 1010). The lower-layer network device then communicates information regarding its configuration to the upper-layer network device (step 1020). With the upper-layer network device now having access to the lower-layer network device's configuration, the upper-layer network device can make a determination as to whether a software image should be downloaded to the lower-layer network device (step 1030). If a software image needs to be downloaded to the lower-layer network device (i.e., the upper-layer network device determines that the software image currently maintained by the lower-layer network device is unacceptable for some reason), the upper-layer network device downloads a new software image to the lower-layer network device (step 1040). Once the new software image is downloaded to the lower-layer network device, or a determination is made by the upper-layer network device that a new software image is not needed, the upper-layer network device monitors and maintains uplink communications with the lower-layer network device, and the network's operation proceeds (step 1050).

As noted, FIG. 10 depicts a flow diagram illustrating a process according to an embodiment of the present invention, as do other of the figures discussed herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Such computer readable media may be permanently, removably or remotely coupled to the computer system which is to execute the computer program or subroutines thereof. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Figure 11:
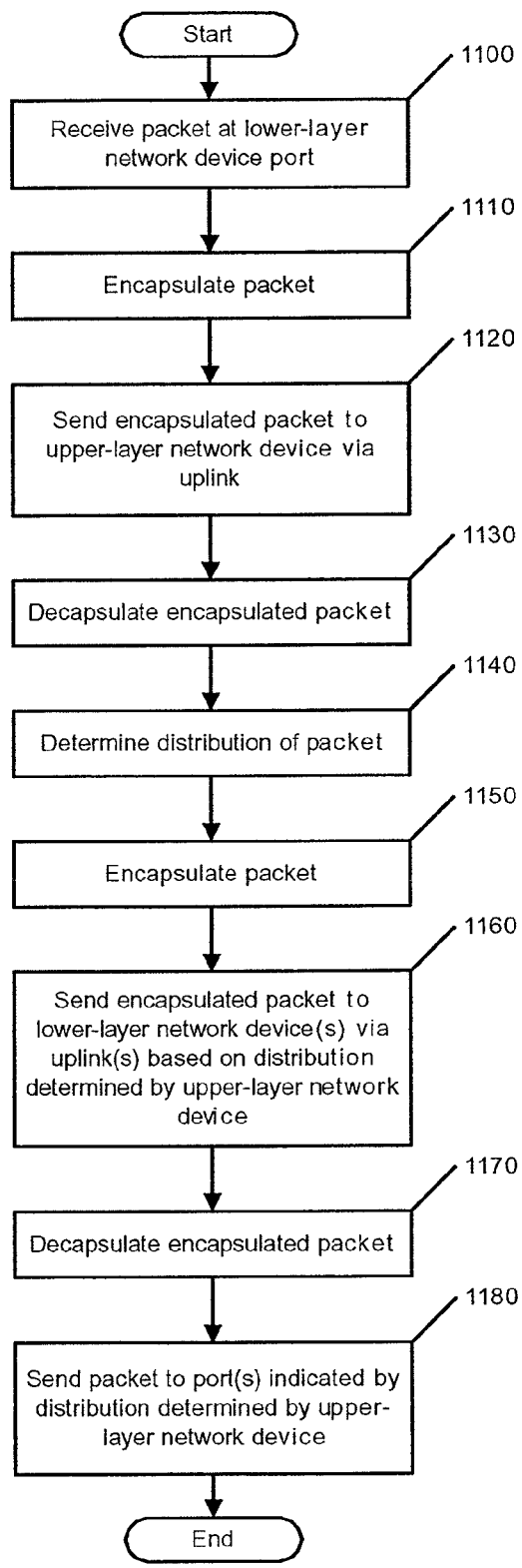
FIG. 11 is a flow diagram illustrating an example of the operation of a network architecture according to embodiments of the present invention.

FIG. 11 is a flow diagram illustrating an example of the operation of a network architecture according to the present invention, and as referred to in step 1050 of FIG. 10. The combination of a lower-level network device and an upper-layer network device (such as those described earlier) can be operated in the following manner when receiving and transmitting packets, for example. The process begins with the receipt of a packet at the lower-layer network device's port (step 1100). Once received, the packet is encapsulated by the lower-layer network device (step 1110). Next, the encapsulated packet is sent from the lower-layer network device to the upper-layer network device via the uplink (step 1120).

The encapsulated packet is then received and decapsulated by the upper-layer network device (step 1130). The now-decapsulated packet, as well as its encapsulation information, are examined in order to determine the manner in which the packet is to be distributed (step 1140). Once this determination is made, and the proper handling of the packet determined, the upper-layer network device encapsulates the packet once more (step 1150). With the destination(s) now determined, the encapsulated packet is sent to one or more lower-layer network devices via their corresponding uplinks, based on this determination (step 1160). The lower-layer network device(s) receiving the encapsulated packet then decapsulate the encapsulated packet (step 1170). The now-decapsulated packet is then sent to the port(s) indicated by the distribution determined by the upper-layer network device (step 1180). Consequently, this provides the packet(s) to the desired destination clients (e.g., the destination host network devices).

An Example Packet Format According to the Present Invention

Figure 12:
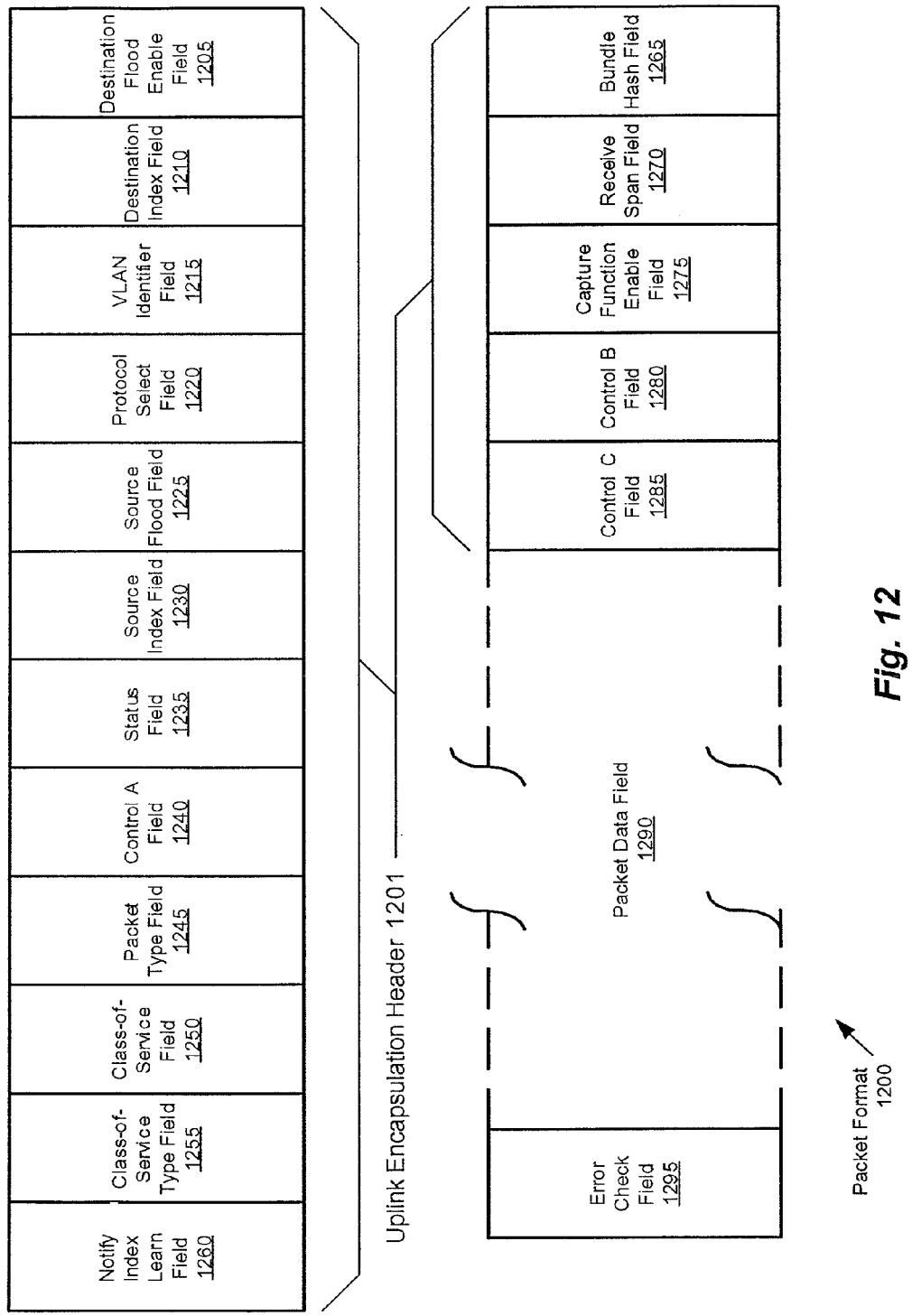
FIG. 12 is a block diagram illustrating the format of a packet according to embodiments of the present invention in greater detail.

FIG. 12 is a block diagram illustrating an example of the format of a packet format used in communicating information between a lower-layer network device and an upper-layer network device of the present invention. More particularly, FIG. 12 depicts a packet format 1200 that can be used to encapsulate packets passed from a lower-layer network device to an upper-layer network device via an uplink, in a network architecture according to the present invention. The portion of the packet format that precedes the packet's data is referred to herein as an uplink encapsulation header, and appears in FIG. 12 as an uplink encapsulation header 1201. Packet format 1200 includes a destination flood enable field 1205, a destination index field 1210, a virtual local area network (VLAN) identifier field 1215, a protocol select field 1220, a source flood field 1225, a source index field 1230, a status field 1235, a control A field 1240, a packet type field 1245, a class-of-service field 1250, a class-of-service type field 1255, a notify index learn field 1260, a bundle-hash field 1265, a receive span field 1270, a capture function enable field 1275, a control B field 1280, a control C field 1285, a packet data field 1290 and an error check field 1295. The contents and uses of these fields are now described.

The contents of destination flood enable field 1205 indicate whether flooding should be enabled (i.e., whether the packet should be flooded to multiple ports) when the packet is traveling in the downstream direction. Destination flood enable field 1205 and destination index field 1210 form the packet's destination index, which is the logical port index (LPI) in the downstream direction (this information is "don't care" when a packet is traveling in the upstream direction). In certain embodiments, destination index field 1210 can be used to control whether a given packet is flooded to a specific lower-layer network device, or to all lower-layer network devices. In still other embodiments, destination index field 1210 can be used to effect flooding of a packet to other distribution layer devices.

The contents of destination index field 1210 indicate the destination index of the packet when the packet is traveling in the downstream direction. This index field is used to address the lower-layer network device's local targeting logic for transmit (downstream) packets. For downstream packets, this is the destination port index (or more simply, destination index).

The contents of VLAN identifier field 1215 identify, for a transmit (downstream) packet, the VLAN within which the packet exists. When receiving data packets from a lower-layer network device, VLAN identifier field 1215 identifies the source VLAN. The lower-layer network device can obtain this information, for example, from an inter-switch link (ISL) packet, an 802.1Q packet or from configuration information of the lower-layer network device.

The contents of protocol select field 1220 indicate the protocol filter mask/protocol select. In the upstream direction, this field is set per the configuration information for the given port. In the downstream direction, this field Encoded value to be masked with the Protocol Mask. Drop the frame is dropped if the result of this masking operation is zero.

The contents of source flood field 1225, along with those of source index field 1230, form a source port index (or more simply, source index). This index provides an option for a network management processor of the upper-layer network device to cause a learned address to be flooded to the lower-layer network devices to which the upper-layer network device is coupled, by sourcing an in-band packet. By this, it is meant that an upper-layer device can source (or transmit) a packet toward a lower-layer device. Such a packet is referred to herein as an "in-band" packet because the packet has a header that is used internally within the lower-layer network device for management purposes and the like (e.g., NMP, routing information, and so on).

The contents of source index field 1230, for transmit (downstream) packets, is the packet's source index. The source index is the port identifier in the upstream direction. When a packet is traveling in the downstream direction, source flood field 1225 and source index field 1230 contain the port identifier for the source port. The packet is dropped if the source port identifier matches the port identifier of the destination port or bundle unless bit 0 of status field 1235 is set (indicating that the packet has been modified at a higher network layer (e.g., layer 3 of the OSI protocol stack), and so may return to its source port).

The contents of status field 1235 reflect the status of the given packet. In one embodiment, this is an eight (8) bit field, with the following sub-fields defined in the upstream direction as follows:

bit 7—Programmable on receive (upstream) path. When set, this indicates that the given port is "trusted". A "trusted port" is a port from which control information can be accepted as being authentic and authorized. Thus, certain information carried in each such packet can be trusted (e.g., COS (class of service), VLAN value, and the like). Alternatively, if the port is not trusted, the values from the configurable registers in the network device are used for every packet received on this port.

bit 6—The packet was received with a length less than some minimum length.

bit 5—The packet was received with a length more than some maximum length.

bit 4—The packet was received as an inter-switch link (ISL) encapsulated packet.

bit 3—The packet was received as an 802.1Q encapsulated packet.

bit 2—The TR (token ring) Encapsulation Flag (indicates token ring encapsulation is used.

bit 1—The packet is a bridge protocol data unit (BPDU) class packet (a BPDU packet of the spanning tree protocol, discovery protocol packet or other packet having a configurable MAC address that is received on spanning tree blocked ports).

bit 0—If set on the transmit (downstream) path, the packet has been rewritten. On the receive (upstream) path, this is the TIC bit (Type-of-Service Input Class) for quality-of-service (QoS).

Status field 1235 is also used to convey the status of the given packet in the downstream direction, with the following sub-fields defined as follows:

bit 7—Don't care.
bit 6—Don't care.
bit 5—Don't care.
bit 4—Don't care.
bit 3—Don't care.
bit 2—For an ISL or 802.1Q packet, user bit 3 or CFI/media type bit, respectively; unused otherwise.
bit 1—The packet is a control packet and uses control packets' reserved space.
bit 0—The packet has been modified (and so at least portions rewritten) at a higher network protocol layer. This allows the packet to return to the source port of the packet. Thus, the source index need not be compared against the port identifier.

Control A field 1240 is the first of three control fields, and contains the following information when the packet is traveling in the upstream direction:

bit 7—Notify New Learn—This information is taken from the configuration register that contains information regarding each port (e.g., LPIs).

bit 6—Disable New Learn—This information is taken from the configuration register that contains information regarding each port.

bit 5—Disable Index Learn—This information is taken from the configuration register that contains information regarding each port.

bit 4—Don't Forward—This information is either taken from the configuration register that contains information regarding each port, or is set for all packets unless the packet is a BPDU/discovery packet when in the SPT learning state.

bit 3—Index Directed—This information is taken from the configuration register that contains information regarding each port.

bit 2—Don't Learn—This information is either taken from the configuration register that contains information regarding each port, or is set for all packets when in SPT blocked/listening states and for all BPDU/discovery protocol packets when in SPT learning/forwarding state.

bit 1—Conditional Learn—This information is taken from the configuration register that contains information regarding each port.

bit 0—Bundle Bypass—This information is taken from the configuration register that contains information regarding each port.

The sub-fields of control A field 1240 are interpreted as follows when the packet is traveling in the downstream direction:

bit 7—Notify New Learn—Don't care.
bit 6—Disable New Learn—Don't care.
bit 5—Disable Index Learn—Don't care.
bit 4—Don't Forward—Drop the packet.
bit 3—Index Directed—Don't care.
bit 2—Don't Learn—Don't care.
bit 1—Conditional Learn—Don't care.
bit 0—Bundle Bypass—When set, use the LPI lookup result directly.

For upstream packets, the lower-layer network device obtains the contents of control A field 1240 from a configuration information stored at the lower-layer network device, with the exception of the "Don't Forward" and "Don't Learn" bits. The lower-layer network device sets or clears these bits depending on the spanning tree state of the given port. As will be appreciated, the lower-layer network device "learns" a given port index by the upper-layer network device instructing the lower-layer network device to store the given LPI for that port. Conversely, the "forward" command causes the lower-layer network device to send the LPI of a given port to the upper-level network device (and/or onward, to other lower-layer network devices).

The contents of packet type field 1245 indicate the type of packet being sent or received. These bits can represent the type bits for ISL purposes, for example.

0000=Ethernet
0001=Token Ring
0010=FDDI
0011=ATM
0100=Reserved
0101=Reserved
0110=Reserved
0111=In-band edit (allows in-band connections to be added and deleted)
1 XXX=Reserved Class-of-service field 1250 defines the class of service for the given packet. This information can be obtained from class-of-service information stored in the packet, as received by the lower-level network device. In the downstream direction, this field can be used in selecting a packet queue, and used also by VLAN-enabled ports.

The contents of class-of-service type field 1255 indicate the type of class-of-service for the packet, after processing by QoS logic. This processing can take place in the lower-level network device and/or the upper-level network device. The lower-level network device in question computes the QoS value. However, in certain cases, this QoS value can be overwritten in the upper-level network device. For upstream packets, the lower-layer network device does the following. The lower-layer network device sets class-of-service type field 1255, if the packet is 802.1Q, ISL or if the port is configured to override the class-of-service information received. The lower-layer network device clears class-of-service type field 1255, if the packet is a normal packet and class-of-service (CoS) value is the default configured for the port. This field is not used in the downstream direction.

Notify index learn field 1260 is a control bit, which indicates that devices receiving such a packet are allowed to learn from this packet (e.g., that the devices are allowed to learn the LPIs carried in the packet). In some cases, this bit is not set, in order to prevent, for example, a forwarding engine from learning the addresses of the given packet. In the upstream direction, this field is configured per configuration information stored at the given port. In the downstream direction, this field is ignored.

The contents of bundle hash field 1265 are used in the hashing that determines which uplink is used in a given transfer, in network architectures that support multiple uplinks between lower- and upper-level network devices. For transmit (downstream) packets, bundle hash field 1265 contains the bundle hash field of the result data. For receive (upstream) packets, this is the port number within the bundle. In upstream packets, bundle hash field 1265 is set using configuration information stored in the lower-level network device.

The contents of receive span field 1270 are used to select the span of a particular port to another port by assigning a span "channel" to an incoming packet. The contents of receive span field 1270 are masked and matched to determine if the lower-layer network device port should take this packet regardless of the normal forwarding destination of the packet (in the downstream direction, this translates to a determination as to whether the packet must be transmitted regardless of the LPI result). This allows for the analysis of packet flows.

In one embodiment, local targeting logic (e.g., LTL 790) is involved in programming LTL memory (e.g., local targeting table 795). In particular, local targeting logic is used for two kinds of switched port analysis (SPAN), egress SPAN and VLAN SPAN. For both types of SPAN, the lower-layer network device's ports are configured as the monitoring/spanning ports. The spanned ports/VLANs monitored by the same spanning port are grouped in a SPAN session identified by a span session identifier. In one embodiment, span session identifiers are numbered from 1, up to the maximum number of sessions supported on the platform.

Capture function enable field 1275 is used to enable the capture function of a particular port. In the downstream direction, if the port is enabled to perform the capture function, the port will take this packet regardless of the normal forwarding destination of the packet. In the upstream direction, this field is ignored. Span and capture can be used, for example, by diagnostics to monitor or copy traffic from transmitter(s) to receiver(s) through a channel, thereby allowing switched port analysis to be performed.

Control B field 1280 is the second of three control fields in packet format 1200. It will be noted that, in some embodiments, these bits are settable on a per-port basis. In the downstream direction, this field is don't care. In the upstream direction, this field is set to the values stored in the port configuration information, using the following definitions:
  bit 7—When this bit is set, the given packet is used for in-band flow creation/deletion.
  bit 6—ignore_qoso. Setting this bit indicates that output QoS should not be applied to this packet.
  bit 5—ignore_qosi. Setting this bit indicates that input QoS should not be applied to this packet.
  bit 4—apply_aclo/ignore_aclo. Depending on the implementation, setting this bit can indicate that only the output access control lists (ACLs) should be applied to this packet, or that the output ACLs should not be applied to this packet.
  bit 3—ignore_acli. Setting this bit indicates that input ACLs should not be applied to this packet, i.e. this packet is automatically "accept"'ed on input ACLs.
  bit 2:0—Reserved Control C field 1285 is the third of the three control fields. In the upstream direction, this field is set to all zeroes. In the downstream direction, this field is set to the following values:
  bit 7-1: Reserved
  bit 0: Core ID—This bit indicates which of two upper-level network devices is sourcing this packet. The ports on the upper-level network devices should be able to configure this bit via software, for example. In doing so, this bit selects the appropriate port distribution mask.

Packet data field 1290 contains the payload of the packet originally received and encapsulated within packet format 1200, sans error correction information (e.g., CRC information). Error checking is instead provided for the entire packet (i.e., over the fields of packet format 1200). Such error checking information is provided for via error check field 1295, which contains the error checking information for the packet.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. An apparatus comprising:
   a lower-layer network device comprising a plurality of ports, wherein,
      the lower-layer network device is configured to prevent a packet received via a first port of the plurality of ports from being transferred from the first port to a second port of the plurality of ports without first being sent from the lower-layer network device to an upper-layer network device via an uplink transmit unit and subsequently received at the lower-layer network device from the upper-layer network device via an uplink receive unit,
      the lower-layer network device comprises the first port and the second port,
      the lower-layer network device comprises an upstream drop decision unit and an upstream queue controller coupled to the upstream drop decision unit,
      the lower-layer network device comprise a lower-layer controller configured to transfer configuration information to the upper-layer network device, wherein
         the lower-layer controller is further configured to receive new configuration information from the upper-layer network device,
      the lower-layer network device comprises a packet processing unit, wherein
         the lower-layer network device is configured to perform a first subset of a plurality of local processing tasks,
         the packet processing unit comprises a queue management module,
         the queue management module is coupled to a downstream queue controller, and
         the downstream queue controller is configured to control buffering of the packet prior to the packet being provided to the second port of the plurality of ports, and the lower-layer network device comprises an interface
controller, wherein
the interface controller comprises local targeting
logic, and
the local targeting logic is configured to identify the
second port of the plurality of ports based on a
logical port index.
2. The apparatus of claim 1, wherein
the packet processing unit is further configured to determine a destination of a packet received from the upper-layer network device, wherein
the destination is identified by local targeting logic information received from the upper-layer network device.
3. The apparatus of claim 1, further comprising:
a downstream drop decision unit; and
a statistics controller.
4. The apparatus of claim 1, wherein
the packet processing unit further comprises a packet buffer controller.
5. A method comprising:
transferring a packet received via a first port of a plurality of ports of a lower-layer network device to an upper-layer network device via an uplink transmit unit of said lower-layer network device, wherein
the lower-layer network device is configured to prevent a packet received via a first port of the plurality of ports from being transferred from the first port to a second port of the plurality of ports without first being sent from the lower-layer network device to an upper-layer network device via an uplink transmit unit and subsequently received at the lower-layer network device from the upper-layer network device via an uplink receive unit,
the lower-layer network device comprises the first port and the second port,
the lower-layer network device comprises an upstream drop decision unit and an upstream queue controller coupled to the upstream drop decision unit,
the lower-layer network device comprise a lower-layer controller configured to transfer configuration information to the upper-layer network device, wherein
the lower-layer controller is further configured to receive new configuration information from the upper-layer network device,
the lower-layer network device comprises a packet processing unit, wherein
the lower-layer network device is configured to perform a first subset of a plurality of local processing tasks,
the packet processing unit comprises a queue management module,
the queue management module is coupled to a downstream queue controller, and
the downstream queue controller is configured to control buffering of the packet prior to the packet being provided to the second port of the plurality of ports, and
the lower-layer network device comprises an interface controller, wherein
the interface controller comprises local targeting logic, and
the local targeting logic is configured to identify the second port of the plurality of ports based on a logical port index.

6. The method of claim 5, wherein
the packet processing unit is further configured to determine a destination of the packet subsequent to receiving the packet via the uplink receive unit, and
the destination is identified by local targeting logic information received from the upper-layer network device.
7. The method of claim 5, wherein
the lower-layer network device further comprises a downstream drop decision unit.
8. The method of claim 5, wherein
the lower-layer network device further comprises a statistics controller.
9. A lower-layer network device comprising:
means for transferring a packet received via a first port of a plurality of ports of a lower-layer network device to an upper-layer network device via an uplink transmit unit of said lower-layer network device, wherein
the lower-layer network device is configured to prevent a packet received via a first port of the plurality of ports from being transferred from the first port to a second port of the plurality of ports without first being sent from the lower-layer network device to an upper-layer network device via an uplink transmit unit and subsequently received at the lower-layer network device from the upper-layer network device via an uplink receive unit,
the lower-layer network device comprises the first port and the second port,
the lower-layer network device comprises an upstream drop decision unit and an upstream queue controller coupled to the upstream drop decision unit,
the lower-layer network device comprise a lower-layer controller configured to transfer configuration information to the upper-layer network device, wherein
the lower-layer controller is further configured to receive new configuration information from the upper-layer network device,
the lower-layer network device comprises a packet processing unit, wherein
the lower-layer network device is configured to perform a first subset of a plurality of local processing tasks,
the packet processing unit comprises a queue management module,
the queue management module is coupled to a downstream queue controller, and
the downstream queue controller is configured to control buffering of the packet prior to the packet being provided to the second port of the plurality of ports, and
the lower-layer network device comprises an interface controller, wherein
the interface controller comprises local targeting logic, and
the local targeting logic is configured to identify the second port of the plurality of ports based on a logical port index.
10. The lower-layer network device of claim 9, further comprising
means for determining a destination of the packet subsequent to receiving the packet via the uplink receive unit, wherein
the destination is identified by local targeting logic information received from the upper-layer network device.
11. The lower-layer network device of claim 9, wherein
the lower-layer network device further comprises a downstream drop decision unit.

12. The lower-layer network device of claim 9, wherein the lower-layer network device further comprises a statistics controller.

13. The apparatus of claim 1, wherein the local targeting logic is configured to
- download logical port index information from the uplink receive unit,
- store the logical port index information in a local targeting table, and
- generate a port select, wherein
  - generating the port select comprises decoding an index stored in the local targeting table to yield a port select mask.

14. The apparatus of claim 1, wherein
- the upper-layer network device comprises a lower-layer protocol processing unit,
- the lower-layer protocol processing unit is configured to perform lower-layer protocol processing on behalf of the lower-layer network device, and
- the lower-layer protocol processing comprises a second subset of the plurality of local processing tasks.

15. The apparatus of claim 1, wherein
- the lower-layer network device is configured to send the packet to the upper-layer network device for further processing, and
- the further processing comprises a second subset of the further processing.

\* \* \* \* \*